(12) United States Patent  
Sugauchi et al.

(10) Patent No.: US 6,587,869 B2  
(45) Date of Patent: *Jul. 1, 2003

(54) INFORMATION PROVIDING SYSTEM HAVING A NETWORK TERMINAL AND NETWORK MANAGEMENT SYSTEM WHICH MANAGES A NETWORK AND PROVIDES INFORMATION OF THE NETWORK TO THE NETWORK TERMINAL

(75) Inventors: Kiminori Sugauchi, Yokohama (JP); Tomohiro Morisada, Yokohama (JP); Toshiaki Hirata, Kashiwa (JP); Satoshi Miyazaki, Yamato (JP); Toshio Sato, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/026,830

(22) Filed: Dec. 27, 2001

(65) Prior Publication Data

US 2002/0055996 A1 May 9, 2002

Related U.S. Application Data

(63) Continuation of application No. 09/516,500, filed on Mar. 1, 2000, now Pat. No. 6,339,789, which is a continuation of application No. 09/027,202, filed on Feb. 20, 1998, now Pat. No. 6,049,827.

(30) Foreign Application Priority Data

Feb. 20, 1997 (JP) .............................................. 9-036375

(51) Int. Cl.⁷ .............................................. G06F 15/16
(52) U.S. Cl. ...................................................... 709/203
(58) Field of Search ................................ 709/203, 217, 709/219, 220, 223, 224, 313, 328, 329

(56) References Cited

U.S. PATENT DOCUMENTS

| | | | | | |
|---|---|---|---|---|---|
| 5,790,977 | A | * | 8/1998 | Ezekiel | 702/122 |
| 5,910,803 | A | * | 6/1999 | Grau et al. | 345/357 |
| 6,003,030 | A | * | 12/1999 | Kenner et al. | 707/10 |
| 6,031,528 | A | * | 2/2000 | Langfahl, Jr. | 345/334 |

* cited by examiner

Primary Examiner—Viet D. Vu
(74) Attorney, Agent, or Firm—Antonelli, Terry, Stout & Kraus, LLP

(57) ABSTRACT

A method, apparatus and computer program for preferentially displaying partial information related to one of a plurality of network equipment connected to a network being managed by a network management system. The partial information is required for network management to be conducted from the network equipment. The network management system collects and stores management information from each network equipment. When conducting network management, a managed terminal sends a request for network management to the network management system, which transfers a program for managing the network to the managed terminal. The transferred program informs the identification of the managed terminal to the network management system which transfers partial information to the managed terminal based on the identification. The managed terminal then displays the transferred partial information so that network management can be conducted from the network equipment.

12 Claims, 29 Drawing Sheets

| IDENTIFIER | HOST NAME | IP ADDRESS |
|---|---|---|
| 1 | PC 11 | AA, AB, AC, AD |
| 2 | PC 12 | AA, AB, AC, AE |
| 3 | PC 13 | AA, AB, AC, AF |
| 4 | PC 21 | AA, AB, AG, AH |
| 5 | PC 22 | AA, AB, AG, AI |
| 6 | PC 31 | AA, AB, AJ, AK |
| ⋮ | ⋮ | ⋮ |

111 MANAGEMENT INFORMATION TABLE

FIG. 5

| IDENTIFIER 502 | SYMBOL NAME 503 | HIGH ORDER SYMBOL 504 | CORRESPONDING NODE 505 | STATE 506 | CLASS 507 |
|---|---|---|---|---|---|
| 1000 | AREA 1 | - | - | NORMAL | NETWORK |
| 1001 | AREA 2 | - | - | NORMAL | NETWORK |
| 1002 | SECTOR1 | 1000 | - | NORMAL | SUBNETWORK |
| 1003 | SECTOR2 | 1000 | - | NORMAL | SUBNETWORK |
| 1004 | SECTOR3 | 1001 | - | NORMAL | SUBNETWORK |
| 1005 | PC11 | 1002 | 1 | NORMAL | COMPUTER |
| 1006 | PC12 | 1002 | 2 | WARNING | COMPUTER |
| 1007 | PC13 | 1002 | 3 | NORMAL | COMPUTER |
| 1008 | PC21 | 1003 | 4 | NORMAL | COMPUTER |
| 1009 | PC22 | 1003 | 5 | NORMAL | COMPUTER |
| 1010 | PC31 | 1004 | 6 | NORMAL | COMPUTER |
| --- | --- | --- | --- | --- | --- |

112 CONFIGURATION INFORMATION TABLE

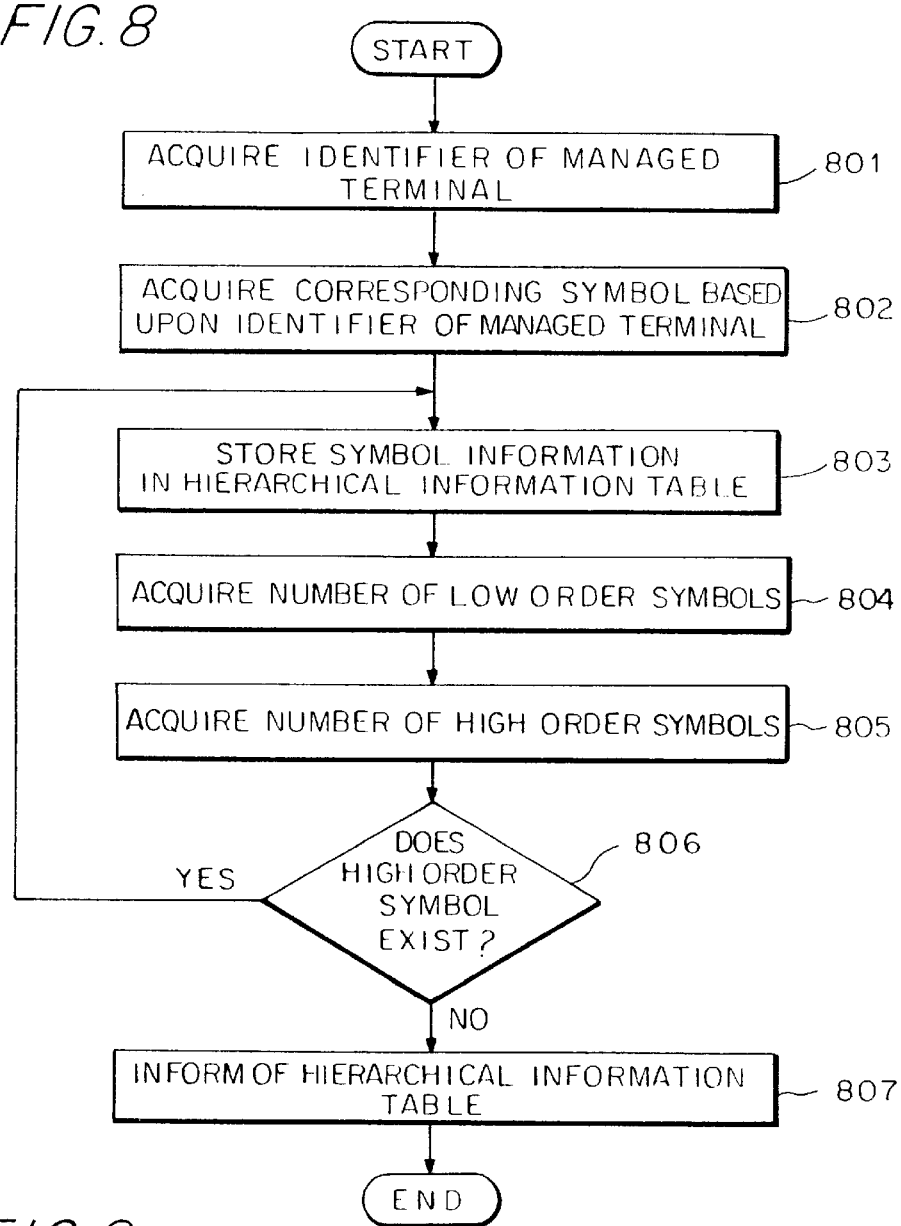

| 1102 | 1103 | 1104 | 1105 | 1106 |
|---|---|---|---|---|
| IDENTIFIER | SYMBOL NAME | CLASS | STATE | NUMBER OF LOW ORDER SYMBOLS |
| 1005 | PC 11 | COMPUTER | NORMAL | 0 |
| 1006 | PC 12 | COMPUTER | WARNING | 0 |
| 1007 | PC 13 | COMPUTER | NORMAL | 0 |

1101 DISPLAY INFORMATION TABLE

FIG. 13

| IDENTIFIER 1302 | CLASS 1303 | STATE 1304 | SYMBOL NAME 1305 | HIERARCHY 1306 | NUMBER OF LOW ORDER SYMBOLS 1307 | HIGH ORDER SYMBOL 1308 |
|---|---|---|---|---|---|---|
| 0 | ROOT | NORMAL | ROOT | 0 | 1 | — |
| 1000 | NETWORK | NORMAL | AREA 1 | 1 | 3 | 0 |
| 1002 | SUBNETWORK | NORMAL | SECTOR 1 | 2 | 3 | 1000 |
| 1005 | COMPUTER | NORMAL | PC 11 | 3 | 0 | 1002 |
| 1006 | COMPUTER | WARNING | PC 12 | 3 | 0 | 1002 |
| 1007 | COMPUTER | NORMAL | PC 13 | 3 | 0 | 1002 |

1301 CONFIGURATION INFORMATION INTERNAL TABLE

FIG. 14

| CLASS (1402) | ICON FORMAT (1403) |
|---|---|
| NETWORK | ○ |
| SUBNETWORK | ○ |
| COMPUTER | □ |

1401 CLASS/ICON RELATING INTERNAL TABLE

FIG. 15

| STATE (1502) | ICON COLOR (1503) |
|---|---|
| NORMAL | GREEN |
| WARNING | YELLOW |

1501 STATE/ICON COLOR RELATING INTERNAL TABLE

FIG. 21

| IDENTIFIER 2102 | IP ADDRESS 2103 | INFORMED TIME 2104 | INFORMED CONTENTS 2105 | INFORMED TYPE 2106 |
|---|---|---|---|---|
| 1 | AA,AB,AC,AD | 11:43:02 | xxxxxxxxxxxxxxxx | 99999 |
| 2 | AA,AB,AC,AD | 11:42:03 | yyyyyyyyyyyyy | 99998 |
| 3 | AA,AB,AC,AE | 11:42:03 | zzzzzzzzzzzzzz | 99997 |
| 4 | AA,AB,AC,AF | 11:42:03 | oooooooooooooo | 99990 |
| 5 | AA,AB,AG,AH | 11:42:02 | bbbbbbbbbbbbbb | 99991 |
| 6 | AA,AB,AJ,AI | 11:42:02 | zzzzzzzzzzzzzz | 99997 |
| --- | --- | --- | --- | --- |

2001 EVENT INFORMATION TABLE

FIG. 31

| MEMORY CAPACITY \ CPU TYPE | CPU-A | CPU-B | CPU-C |
|---|---|---|---|
| SMALLER THAN 10 MB | ONLY SYMBOL NAME | EXCEPT NUMBER OF LOW ORDER SYMBOLS | ALL |
| 10 TO 20 MB | SYMBOL TYPE, SYMBOL NAME | EXCEPT NUMBER OF LOW ORDER SYMBOLS | ALL |
| LARGER THAN 20MB | ALL | ALL | ALL |

3001 EACH DEVICE DISPLAY CONTENTS DETERMINING TABLE
3102
3103

| IDENTIFIER | SYMBOL NAME |
|---|---|
| 1005 | PC 11 |
| 1006 | PC 12 |
| 1007 | PC 13 |

1101 DISPLAY INFORMATION TABLE

INFORMATION PROVIDING SYSTEM HAVING A NETWORK TERMINAL AND NETWORK MANAGEMENT SYSTEM WHICH MANAGES A NETWORK AND PROVIDES INFORMATION OF THE NETWORK TO THE NETWORK TERMINAL

This is a continuation of application Ser. No. 09/516,500, filed Mar. 1, 2000 now U.S. Pat. No. 6,339,789, which is a continuation of application Ser. No. 09/027,202, filed Feb. 20, 1998, now U.S. Pat. No. 6,049,827.

BACKGROUND OF THE INVENTION

The present invention relates to a network management system for managing a network. More particularly, the present invention relates to a method, apparatus and computer program for allowing management of a network by use of network equipment, being managed on the network by a network management system, by preferentially displaying partial information related to the network equipment that is required for network management on the network equipment.

Generally, a network management system for collecting management information from each of plural network equipment existing in a network and storing the management information in the network management system is used for managing a network. Information required for network management including the collected management information is displayed by the network management system. Particularly, the network management information being displayed includes a configuration of the network being managed in the form of a map in which the network is schematically shown.

A network is divided into hierarchies such as geographical classification, management classification and detailed information and is displayed in the form of a map having a plurality of hierarchical levels as described on pages 60 to 65 in "Hewlet-Packard Journal", April 1990. Such is performed so that a management operator can readily grasp a large-scale complicated network configuration at an instant. A technique for changing displayed contents of a configuration according to a management operator in consideration of a case that a network management system is used by plural managers is disclosed in Japanese published unexamined patent application No. 7-312596. A technique for enabling an arbitrary computer except a network management system, to access the same contents as contents displayed by the network management system utilizing a web browser is disclosed on pages 38 and 39 in "Nikkei Computer" November 11 Appendix 1996 as a type of network management in the environment of an Internet/intranetwork. However, in such a technique, a web browser which can access only one screen at a time cannot access plural maps simultaneously when, for example, in case a network management system displays a map for each hierarchy level. Thus, there is a problem that the display of a network configuration using a web browser is difficult to grasp. The utilization of a web browser allows network equipment which is managed by a network management system, to access the same contents displayed by the network management system and to execute network management.

For a user who executes network management via network equipment which is managed by a network management system may be either an end user or a management operator. However, an end user often requires partial information related to the managed network equipment being used of information required for network management. Similarly, a management operator may also require partial information related to the managed networks equipment being used. Such partial information is not supplied. Thus, a user who uses managed equipment is required to find the partial information related to the managed equipment being used. That is, the user must find partial information corresponding to the same contents as that displayed by a network management system. However, as the information volume of contents displayed by a network management system is enormous, the operation to find such partial information is very burdensome.

In conventional apparatus disclosed in Japanese published unexamined patent application No. 7-312596, only a change in the displayed contents performed by a management operator at, for example, a network management system which manages network equipment on a network are effected. Thus, when a management operator executes network management via a managed network equipment on the network the contents of the display are not changed.

SUMMARY OF THE INVENTION

An object of the present invention is to enable preferentially displaying partial information, related to network equipment being managed on the network by a network management system, equipment of information required for network management when network management is to be executed on the network equipment.

To achieve the above object, the present invention provides a network which is managed by a network management system. The network management system collects management information from each of a plurality of network equipment existing in the network and stores the management information collected from the plural network equipment. Network management of the network can be accomplished in response to a request from one of the network equipment by accessing the network management system and causing the network management system to transfer a program for managing the network to the network equipment requesting network management. The network equipment requesting network management informs the network management system of identification information for identifying the network equipment using the transferred program. The network management system then transfers partial information related to the network equipment as indicated by the identification information. The partial information includes information required for network management by the network equipment. The network equipment then displays the transferred partial information.

According to the present invention since partial information related to the network equipment requesting network management is transferred from the network management system to the network equipment and displayed on the network equipment, a user is not required to find partial information related to the network equipment being used. Therefore, the user can immediately execute network management.

If a browser has been installed in the network equipment and a program for managing a network has not been installed in the network equipment, then the network equipment can still effect management of the network according to the present invention. In the present invention the network equipment displays partial information obtained by a program for managing a network transferred from a network management system. Thus, a user can execute network management via the network equipment utilizing the browser. Therefore, the present invention provides a network management tool that can be installed in a network management system.

It should be noted that the present invention can be implemented using a computer program written in the JAVA programming language (JAVA is a trademark of Sun Microsystems Inc.) or the ACTIVE X programming language (ACTIVE X is a trademark of Microsoft Inc.). The ACTIVE X programming language is similar in operation to the JAVA programming language. In the present invention the program transferred from the network management system to the network equipment requesting network management can be written in the form of an "Applet" which causes the display of the partial information on the network equipment. An Applet is a special program transferable on a network that can be executed in the receiving computer. The Applet is activated when transferred from the network management system to the network equipment.

A first embodiment of the present invention provides a network management tool that can be installed in a network management system for collecting management information from each of a plurality of network equipment connected to a network, storing the management information therein and displaying the configuration of the network in the form of a plurality of hierarchically arranged maps. The network management system includes a display program which is activated when it is transferred to a network equipment. The display program, which can be an Applet in the JAVA or ACTIVE X programming languages, causes the display of information required for network management on a network equipment requesting network management of the network. The network management system also includes a transfer program for transferring the display program to the network equipment requesting management (hereinafter called "management request equipment") and an information program for informing the display program transferred to the management request equipment of information required for display to effect network management.

The first embodiment of the present invention also provides a managed terminal included in each of the network equipment connected to the network. The managed terminal includes a transfer request program for requesting transfer of the display program when network management is to be conducted from the network equipment in which the managed terminal is installed.

The information program of the network management system executes processing for generating inclusive relationship information showing inclusive relationships among components on the network related to the network equipment specified by the display program transferred to the management request equipment. The network equipment is included in the hierarchically arranged maps that the network management system displays. The information program informs the display program of the generated inclusive relationship information. The display program executes processing for specifying the management request equipment by collecting identification information for identifying the management request equipment, informing the information program of the collected identification information and causing the display of a partial network configuration related to the management request equipment in the form of an inclusive tree based upon the inclusive relationship information informed by the information program.

According to the first embodiment, the partial network configuration related to the management request equipment can be preferentially displayed on the management request equipment. Particularly, as the hierarchically arranged maps are displayed in the form of an inclusive tree shown on one screen in the management request equipment, a user using the management request equipment can readily grasp the partial network configuration related to the management request equipment. Management in the above-described manner can be effected even if a browser being used can access only one screen at a time.

If a partial network configuration related to the management request equipment is not necessarily required to be displayed on one screen, the network management system may be constructed so that the information program executes processing for informing the display program of a partial map related to the network equipment specified by the display program transferred to the management request equipment. The display program executes processing for specifying the management request equipment by collecting identification information for identifying the management request equipment and informing the information program of the collected identification information. Thereafter the display program executes a processing for causing the display of the partial map as informed by the information program.

Also, if one screen is used and partial network configuration related to the management request equipment is not necessarily required to be displayed, the network management system may be constructed so that the information program executes processing for generating inclusive relationship information showing inclusive relationships among components included in each of the hierarchically arranged maps that the network management system displays. The information program also executes a processing for informing the display program of the generated inclusive relationship information. The display program executes processing for causing the display of the configuration of the network in the form of an inclusive tree based upon the inclusive relationship information from the information program.

In the above-described first embodiment, the display program can further execute a processing for causing the deletion of components selected by an external device if the selected components are shown in an inclusive tree, a processing for acquiring the inclusive relationship information from the information program of components selected by an external device not shown in an inclusive tree and a processing for causing the addition of a partial network configuration, related to a selected component of an inclusive tree, to the inclusive relationship information from the information program. The partial network configuration is obtained in response to a request for inclusive relationship information.

The information program can further execute a processing for generating inclusive relationship information showing inclusive relationships among components. The inclusive relationship information is required by the display program which causes the display of components included in each of the hierarchically arranged maps that a network management system displays and requested by the management request equipment for network management. The information program also executes a processing for informing the display program of the generated inclusive relationship information. Using the above-described features of the present invention a user of the management request equipment can delete an unnecessary part of the information being displayed and can add information to a part of the information being displayed deemed insufficient.

Further, in the above-described first embodiment, the information program can further execute a processing for calculating the number of components included in a map of a lower order level of the hierarchically arranged maps. The components correspond to components in each of the higher order level maps. The hierarchically arranged maps are displayed by the network management system. The components of the lower order level maps are hereinafter called "lower order components". The information program also executes a processing of informing the display program transferred to the management request equipment of the calculated number of low order components. The display program executes a processing for causing the display of the number of lower order components from the information program together with all of the components shown in an inclusive tree. Using the above-described features of the present invention a user of the management request equipment can be informed of the number of components included in each of the components included in an inclusive tree by seeing the displayed number of lower order components.

Further, in the above-described first embodiment, the display program can further execute a processing for causing a part of the information displayed on the management request equipment related to the management request equipment to be highlighted. Using the above-described features of the present invention a user of the management request equipment can readily find a part related to the management request equipment within the displayed information.

A second embodiment of the present invention, similar to the first embodiment, provides a network management tool having a network management system and a managed terminal included in each of the network equipment as described above. However, the configuration of the network management system in the second embodiment is different from the first embodiment in that the network management system periodically collects event information from each of the network equipment connected to the network. The event information collected from the network equipment is stored in the network management system as an event log which includes information concerning the IP address of the network equipment in which an event has occurred, the time of the event, and information concerning the type of event. The display program when transferred to the management request equipment and activated by the transfer is informed of event information by the network management system. Thereafter the display program causes the display of event information from the network management system related to the management request equipment so as to permit network management. The second embodiment allows a user to expand the details of the event information being displayed on the management request equipment.

A third embodiment of the present invention, similar to the first embodiment, provides a network management tool having a network management system and a managed terminal included in each of the network equipment as described above. However the configuration of the network management system in the third embodiment is different from that in the first embodiment in that the network management system allows for retrieval of management information which satisfies a particular retrieval condition set by a user at a managed terminal which is included in a network equipment management request equipment. The management information which satisfies the set retrieval condition is management information related to the management request equipment. The user when using the managed terminal in the third embodiment may set the attribute of a retrieval condition through a retrieval screen displayed on the management request equipment.

A fourth embodiment of the present invention, similar to the first embodiment, provides a network management tool having a network management system and a managed terminal included in each of the network equipment as described above. However, the configuration of the network management system is different from that in the first embodiment in that a network management system determines the performance capabilities of the management request equipment and transfers an amount of management information to the management request equipment according to the determined performance capabilities. This feature of the fourth embodiment allows for the details of the display of management information to be set in accordance with the performance capabilities of the management request equipment.

BRIEF DESCRIPTION OF THE DRAWINGS

The present invention will be more apparent from the following detailed description, when taken in conjunction with the accompanying drawings, in which:

FIG. 5 is an explanatory drawing illustrating a configuration information table in the first embodiment;

FIG. 8 is a flowchart illustrating the outline of the operation of the filtering section of a configuration information filtering program in the first embodiment;

FIG. 9 is an explanatory drawing illustrating a hierarchical information table in the first embodiment;

FIG. 13 is an explanatory drawing illustrating the construction of a configuration information internal table in the first embodiment;

FIG. 14 is an explanatory drawing illustrating a class/icon relating internal table in the first embodiment;

FIG. 15 is an explanatory drawing illustrating a state/icon color relating internal table in the first embodiment;

FIG. 21 is an explanatory drawing illustrating an event information table in the second embodiment;

FIG. 31 is an explanatory drawing illustrating an each device display contents determining table in the fourth embodiment;

DESCRIPTION OF THE PREFERRED EMBODIMENTS

Figure 1:
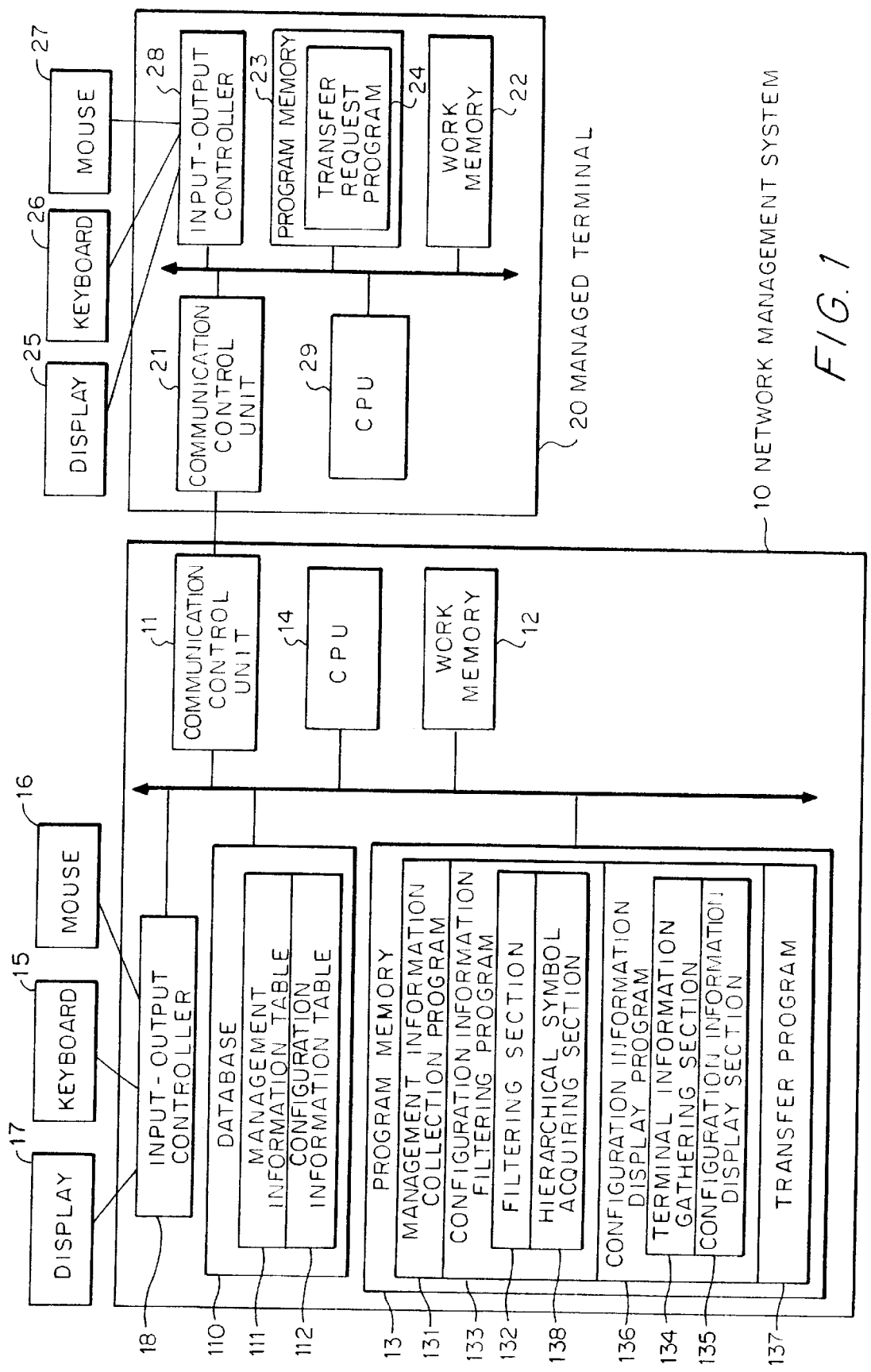
FIG. 1 is a block diagram illustrating the configuration of a network management system and a managed terminal respectively equivalent to a first embodiment.

Referring to the drawings, embodiments to which a network management tool according to the present invention is applied will be described below.

First, referring to FIGS. 1 to 17, a first embodiment of the present invention will be described.

The first embodiment enables partial network configuration related to a network equipment to be preferentially displayed in the form of a containment tree if network management is executed from an arbitrary network equipment provided with a display function (hereinafter called a managed terminal) which is equipment managed by a network management system.

Figures 2, 3:
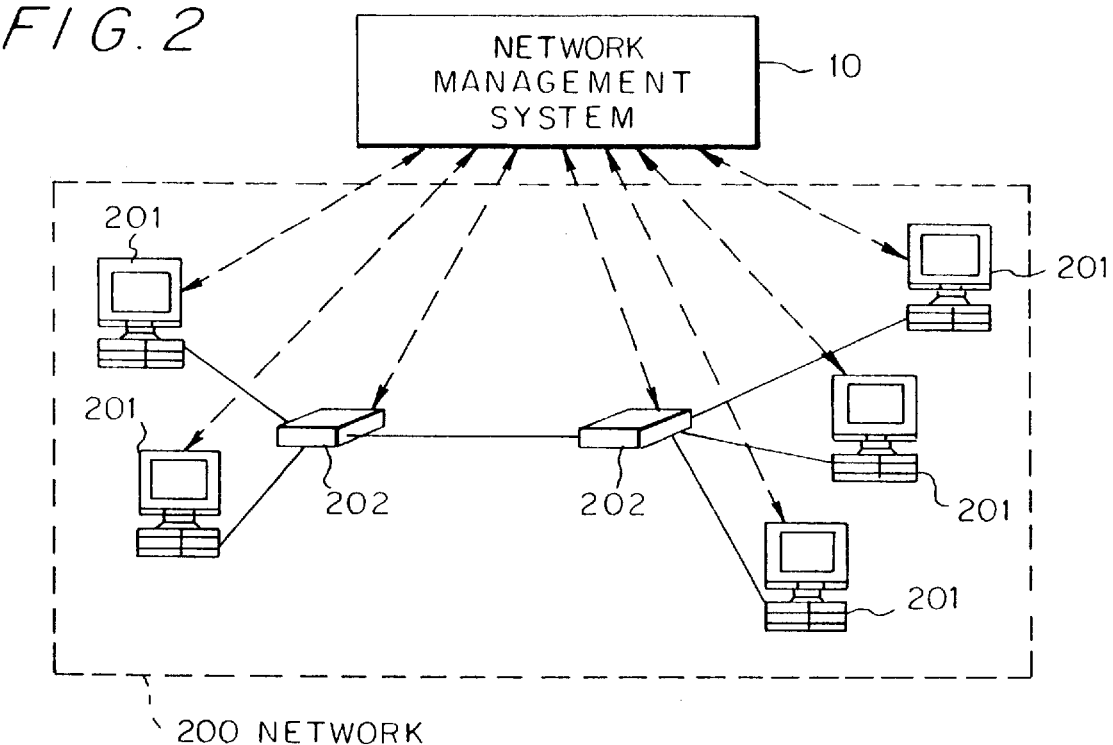
FIG. 2 is an explanatory drawing illustrating an example of the configuration of a network managed by the network management system.
FIG. 3 is an explanatory drawing illustrating the construction of a management information table in the first embodiment.

FIG. 1 is a block diagram showing the configuration of a network management system and a managed terminal respectively equivalent to the first embodiment. As shown in FIG. 1, a reference number 10 denotes a network management system which collects management information from each of a plurality of network equipment 201 and 202 defined as managed equipment including, for example, a computer or a transfer equipment connected to a network 200 as shown in FIG. 2. Upon collecting the management information, the network management system 10 stores the management information therein. As also shown in FIG. 1, a reference number 20 denotes a managed terminal which is included in each network equipment 201 and 202 as shown in FIG. 2.

As shown in FIG. 1, the network management system 10 is provided with a communication control unit 11 for controlling communication between the network management system 10 and the network equipment 201 and/or 202 represented by the managed terminal 20, a database 110 for storing a management information table 111 which stores management information collected from each of the network equipment 201 and 202 and a configuration information table 112 which stores configuration information required for displaying the configuration of the network 200, a work memory 12 which functions as an operation area when a processing is conducted for storing information in the database 110 and a temporary storage area when a processing is conducted for retrieving required information from the database 110, a program memory 13 for storing a management information collection program 131, a configuration information filtering program 133, a configuration information display program 136 and a transfer program 137, and a central processing unit (CPU) 14 for controlling access to the work memory 12 and the database 110 and for executing each of the programs in the program memory 13. Further, the network management system 10 is provided with a keyboard 15, a mouse 16, a display 17 and an input-output controller 18 for controlling the input-output of data to and from these elements.

The management information collection program 131 is a program for collecting management information from each of the computers 201 and 202 which are managed equipment and managing the registration/update of management information in the management information table 111. The configuration information filtering program 133 is a program for acquiring configuration information required for displaying partial network configuration related to the managed terminal 20 and is provided with a filtering section 132 and hierarchical symbol acquiring section 138. The configuration information display program 136 is a program transferred to the managed terminal 20 and activated in the managed terminal 20 for causing the display of partial network configuration related to the managed terminal 20 on the managed terminal 20 and is provided with a terminal information gathering section 134 and a configuration information display section 135. The transfer program 137 is a program for transferring the configuration information display program 136 to the managed terminal 20.

The configuration information display program 136 can be what is known in the art as an Applet which is a type of program transferable across networks according to the JAVA or the ACTIVE X programming languages. JAVA is a trademark of Sun Microsystems Inc., an ACTIVE X is a trademark of Microsoft Inc.

As shown in FIG. 1, the managed terminal 20 is provided with a communication control unit 21 for controlling communication between the managed terminal 20 and the network management system 10, a work memory 22 which functions as an operation area when the configuration information display program 136 transferred from the network management system 10 is executed, a program memory 23 in which a transfer request program 24 for requesting the network management system 10 to transfer the configuration information display program 136 is stored and a CPU 29 for controlling access to the work memory 22 and for executing each of the programs stored in the program memory 23. Further, the managed terminal 20 is provided with a keyboard 26, a mouse 27, a display 25 and an input-output controller 28 for controlling the input-output of data to and from these elements.

In the network management system 10, CPU 14 periodically collects management information from each of the network equipment 201 and 202 represented by the managed terminal 20 via the communication control unit II and stores the collected management information in the management information table 111 by executing the management information collection program 131.

FIG. 3 shows an example of the construction of the management information table 111. For the purpose of example a TCP/IP communication protocol is used in the network 200. Any other communication protocol can be used. As shown in FIG. 3, the management information table 111 includes for each identifier 302 of managed equipment representing network equipment 201 and 202, the host name 303 of managed equipment and the IP address 304 of the managed equipment.

Figure 4:
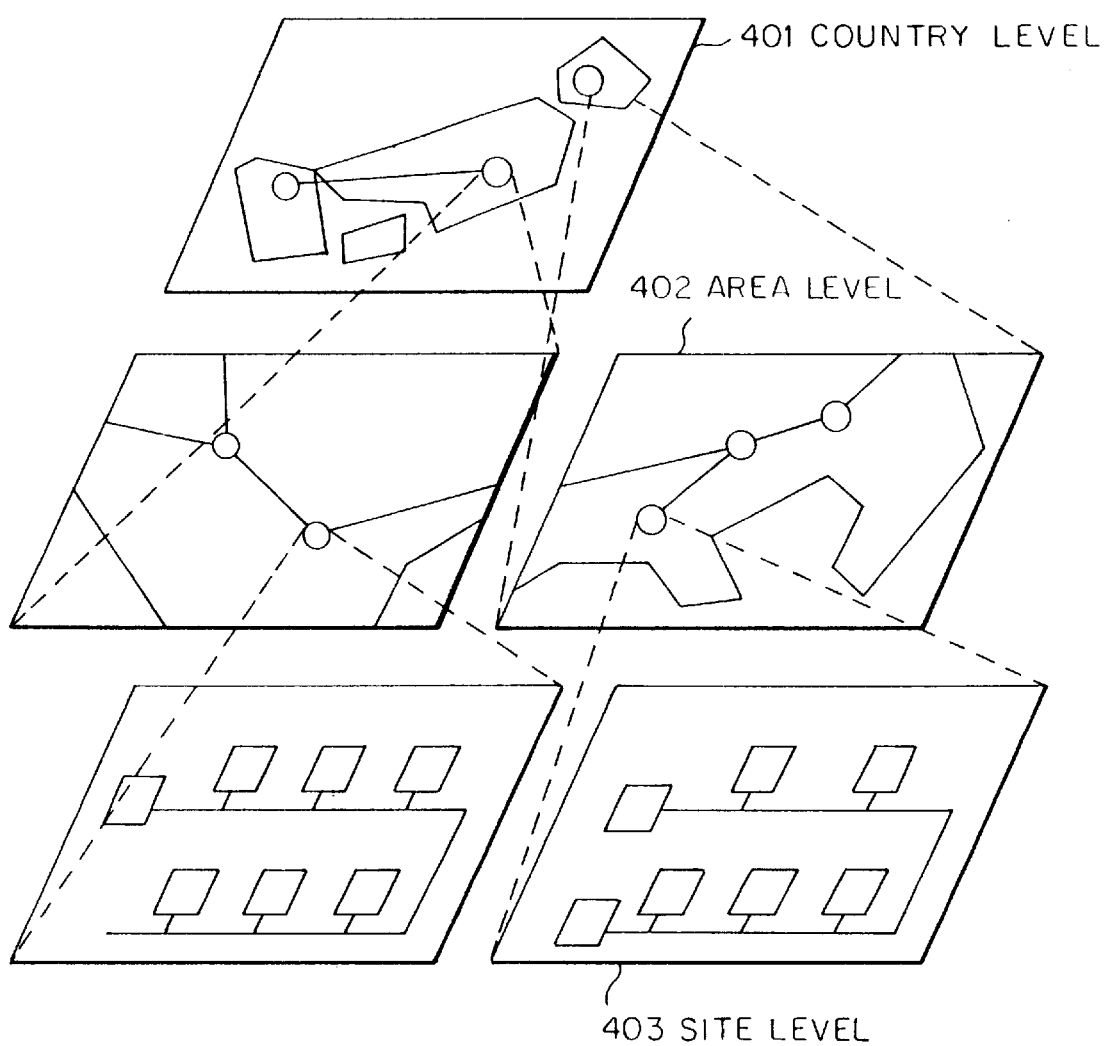
FIG. 4 is an explanatory drawing illustrating a hierarchical map displayed on the display of the network management system.

Further, CPU 14 displays a map hierarchically representing the configuration of the network 200 geographically expanded as shown in FIG. 4 for example based upon management information stored in the management information table 111 on the display 17. As shown in FIG. 4, a reference number 401 denotes a map showing the whole configuration, for example, at a country level of the network 200. The detailed configuration of the network 200 is hierarchically represented by sequentially pulling down from the map 401 to a map 402 showing partial configuration at, for example, an area level and a map 403 showing partial configuration at, for example, a site level. A table used when these maps 401 to 403 are displayed is the configuration information table 112 as shown in FIG. 5.

The configuration information table 112 includes for each identifier 502 of managed equipment representing the network equipment 201 and 202, the name 503 of a symbol, a high order symbol 504 which is the identifier of a symbol included in a high order level of a map, the corresponding node 505 which is the identifier of managed equipment shown by the symbol, the state 506 of the managed equipment shown by the symbol and the class 507 of the managed equipment shown by the symbol for each identifier 502. Each symbol 503 represents, for example, a managed equipment 20 for representing network equipment 201 and 202 included in the map 401 displayed as shown in FIG. 4 based upon management information stored in the management information table 111.

The operation of the first embodiment will be described below.

Figure 6:
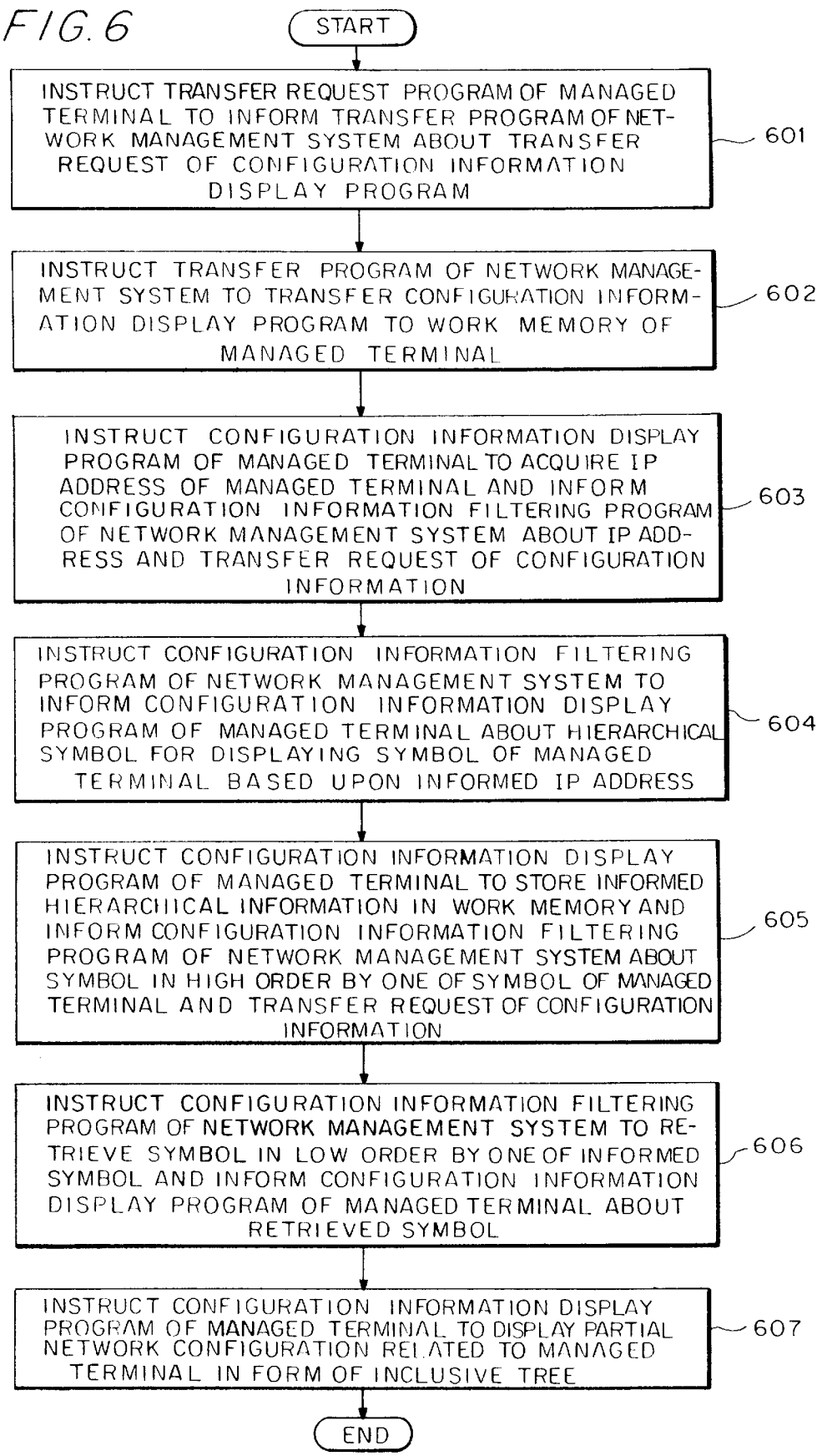
FIG. 6 is a flowchart illustrating the outline of the operation of the network management system and the managed terminal in the first embodiment.

FIG. 6 is a flowchart showing the outline of the operation of the network management system 10 and the managed terminal 20. It should be noted that each of the steps of the flowchart correspond to code of a computer program.

As shown in FIG. 6, when a user instructs the managed terminal 20 to execute network management, first, the transfer request program 24 informs the transfer program 137 of the network management system 10 of a request for transferring the configuration information display program 136 (step 601). When the transfer program 137 receives the request for transferring the configuration information display program 136 from the managed terminal 20, the transfer program 137 transfers the configuration information display program 136 stored in the program memory 13 to the work memory 22 of the managed terminal 20 (step 602).

Figure 7:
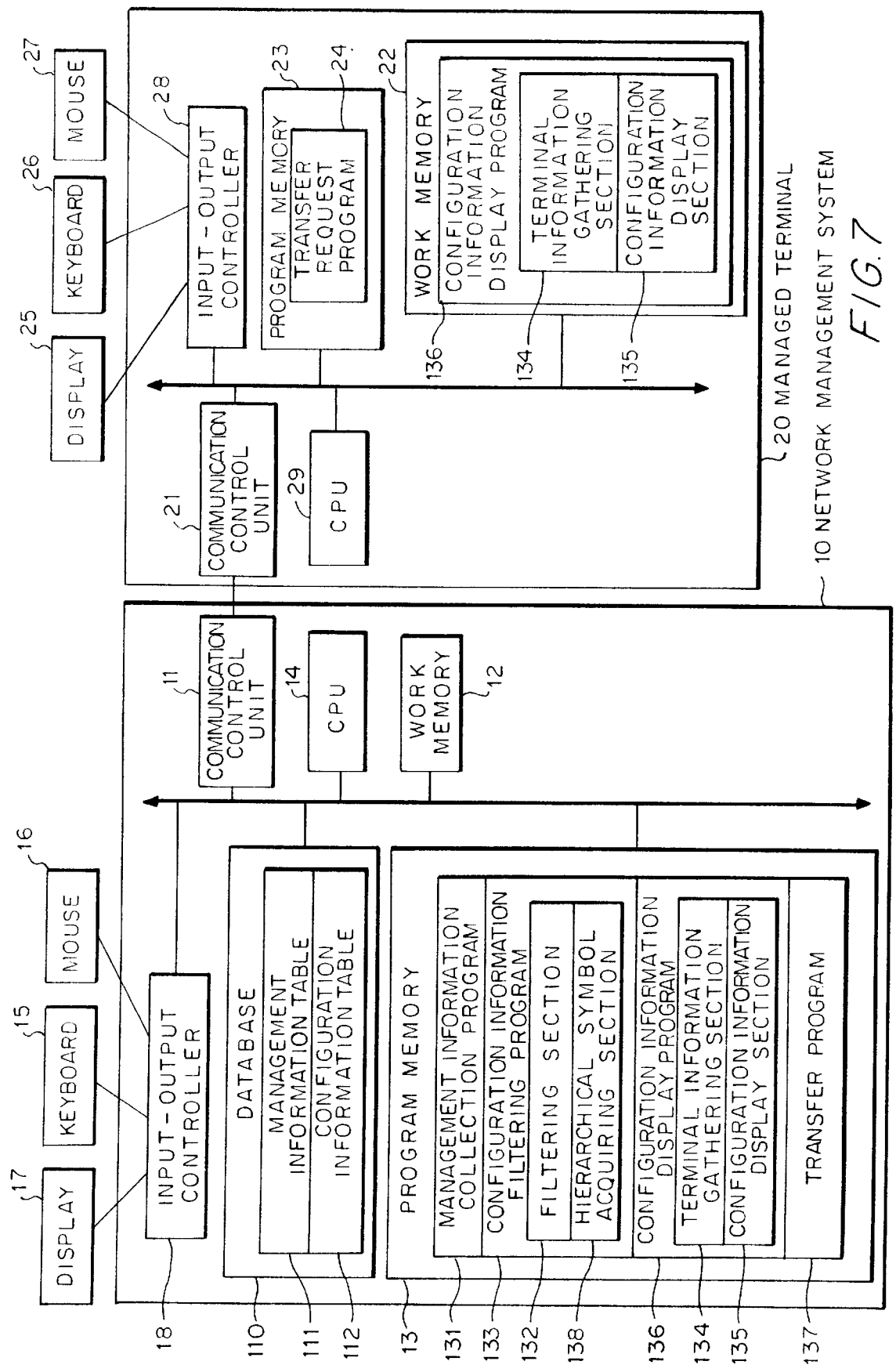
FIG. 7 is an explanatory drawing illustrating a state after a configuration information display program is transferred to the managed terminal in the first embodiment.

When the configuration information display program 136 is transferred from the network management system 10 to the work memory 22, it is automatically activated. FIG. 7 shows the state of the managed terminal 20 after the configuration information display program 136 has been transferred to the work memory 22 of the managed terminal 20. When the configuration information display program 136 is activated in the managed terminal 20, first, the terminal information gathering section 134 acquires the IP address of the managed terminal 20 and informs the configuration information filtering program 133 of the network management system 10 of the request for transferring configuration information together with the acquired IP address (step 603).

As an alternative to the acquiring of the IP address of the managed terminal 20 the terminal information gathering section 134 can be included in the configuration information filtering program 133 on the network management system 10. The terminal information gathering section 134 of this construction acquires the IP address of the managed terminal from a transfer log provided in the network management system 10. The transfer log has stored therein log records providing information of the terminal that requested transfer of the configuration information display program 136. The log records are caused to be generated by the transfer program 137 when the transfer program 137 transfers the configuration information display program 136 to the managed terminal 20.

When the configuration information filtering program 133 receives the request for transferring configuration information and the IP address from the managed terminal 20, the configuration information filtering program 33 acquires hierarchical information showing a location in a map including the symbol of the managed terminal 20 by filtering required information from the configuration information table 112 based upon the received IP address, and informs the configuration information display program 136 of the managed terminal 20 of the acquired hierarchical information (step 604).

FIG. 8 is a flowchart showing the outline of the operation of the filtering section 132 of the configuration information filtering program 133. It should be noted that each of the steps of the flowchart corresponds to code of a computer program.

As shown in FIG. 8, the filtering section 132 first retrieves an IP address 304 equal to the IP address received from the managed terminal 20 from the management information table 111 and acquires for selecting an identifier 302 corresponding to the retrieved IP address 304, that is, the identifier 302 of the managed terminal 20 (step 801). Next, the filtering section 132 acquires a symbol having the identifier 302 acquired in step 801 as the corresponding node 505, that is, the symbol of the managed terminal 20 from the configuration information table 112 (step 802). Next, the filtering section 132 specifies the symbol of the managed terminal 20 acquired in step 802 for a symbol to be acquired and stores the symbol information of the acquired symbol in a hierarchical information table 901 shown in FIG. 9 (step 803).

As shown in FIG. 9, contents stored as symbol information includes the identifier 902 of an acquired symbol, the symbol name 903 of the acquired symbol, the state 904 of managed terminal shown by the acquired symbol, the class 905 of the managed terminal shown by the acquired symbol and the number of subordinate symbols 906 which is the number of symbols included in lower order levels of the map under the acquired symbol. The information 902 to 905 except the number of subordinate symbols 906, are transferred from the configuration information table 112. The number of subordinate symbols 906 can be acquired by checking the number of symbols the high order symbol 504 of which is a symbol to be acquired in the configuration information table 112 (step 804).

When the symbol information of the acquired symbol is stored in the hierarchical information table 901 as described above, the filtering section 132 specifies that high order symbols 504 be acquired and stored in the hierarchical information table 901 (step 805).

If a higher order symbol exist, then steps 803 to 805 are repeated until no high order symbol 504 exists (step 806). If no higher order symbols 504 exist then the hierarchical information table 901 showing location in a map including the symbol of the managed terminal 20 is generated. When the generation of the hierarchical information table 901 is finished, the filtering section 132 informs the configuration information display section 135 of the managed terminal 20 of the generated hierarchical information table 901 (step 807).

When the configuration information display section 135 receives the hierarchical information table 901 from the filtering section 132 of the network management system 10 as shown in FIG. 6, the configuration information display section 135 stores the received hierarchical information table 901 in the work memory 22 and informs the configuration information filtering program 133 of the network management system 10 of a request for transferring configuration information together with the identifier 902 of a symbol in a higher order level of the map of the managed terminal 20 in the hierarchical information table 901 (a step 605). When the configuration information filtering program 133 receives the request for transferring configuration information and the identifier 902 of the symbol from the managed terminal 20, configuration filtering program 133 informs the configuration information display section 135 of the managed terminal 20 of all symbols included in maps of lower order levels related to a symbol shown by the received identifier 902 by the hierarchical symbol acquiring section 138. That is, all symbols included in lower order level maps related to the symbol of the managed terminal 20 (a step 606) are informed.

Figures 10, 11:
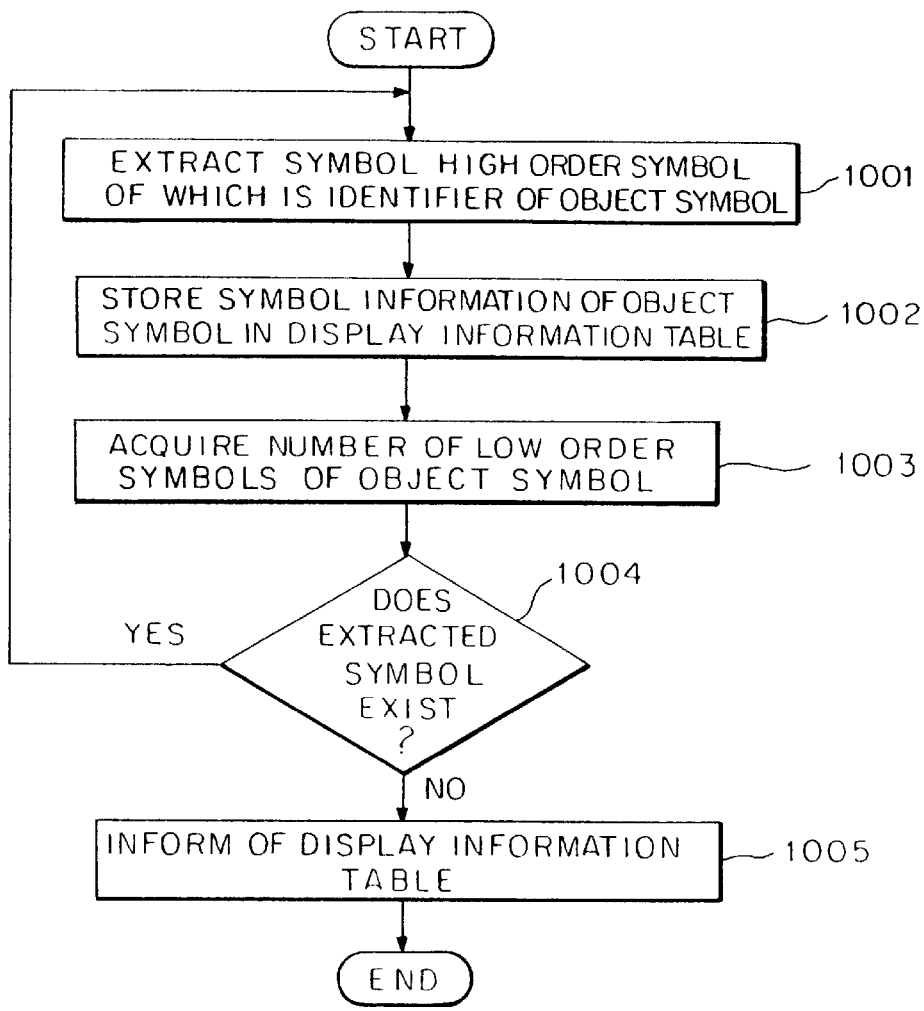
FIG. 10 is a flowchart illustrating the outline of the operation of the hierarchical symbol acquiring section of the configuration information filtering program in the first embodiment.
FIG. 11 is an explanatory drawing illustrating a display information table in the first embodiment.

FIG. 10 is a flowchart showing the outline of the operation of the hierarchical symbol acquiring section 138 of the configuration information filtering program 133. It should be noted that each of the steps of the flowchart corresponds to code of a computer program.

As shown in FIG. 10, the hierarchical symbol acquiring section 138 extracts a symbol having the identifier 902 of a symbol received from the managed terminal 20 as a high order symbol 504 from the configuration information table 112 (step 1001). Next, the hierarchical symbol acquiring section 138 specifies the symbol extracted in the step 1001 for a symbol to be acquired and stores symbol information of the acquired symbol in a display information table 1101 shown in FIG. 11 (step 1002).

As shown in FIG. 11, the display information table 1101 includes symbol information consisting of an identifier 1102 of an acquired symbol, a symbol name 1103 of the acquired symbol, a class 1104 of managed equipment shown by the acquired symbol, a state 1105 of the managed equipment shown by the acquired symbol and the number of subordinate symbols 1106 which is the number of symbols included in lower order level maps under the acquired symbol. The information 1102 to 1105, except the number of subordinate symbols 1106, are picked up from the configuration information table 112. The number of subordinate symbols 1106 can be acquired by checking the number of symbols the high order symbol 504 of which is an acquired symbol in the configuration information table 112 (step 1003).

When the symbol information of the acquired symbol is stored in the display information table 1101 as described above, the hierarchical symbol acquiring section 138 returns processing to step 1001 to store the symbol information of the following symbols in the display information table 1101 until no other symbol having the identifier 902 of the symbol received from the managed terminal 20 as a high order symbol 504 exists (step 1004). When the steps 1001 to 1004 are repeated, the display information table 1101 in which symbol information of all symbols included in a map including the symbol of the managed terminal 20 is stored is generated. When the generation of the display information table is finished, the hierarchical symbol acquiring section 138 informs the configuration information display section 135 of the managed terminal 20 of the generated display information table 1101 (step 1005).

As shown in FIG. 6, in the managed terminal 20, when the configuration information display section 135 of the configuration information display program 136 receives the display information table 1101 from the hierarchical symbol acquiring section 138 of the network management system 10, the configuration information display section 135 causes the display of a partial network configuration related to the managed terminal 20 in the form of an containment tree based upon the hierarchical information table 901 and the display information table 1101 (step 607). The display information table 1101 and the hierarchical information table 901 stored in the work memory 22 in the step 605 are equivalent to containment relationship information showing containment relationship among symbols related to the managed terminal 20.

Figure 12:
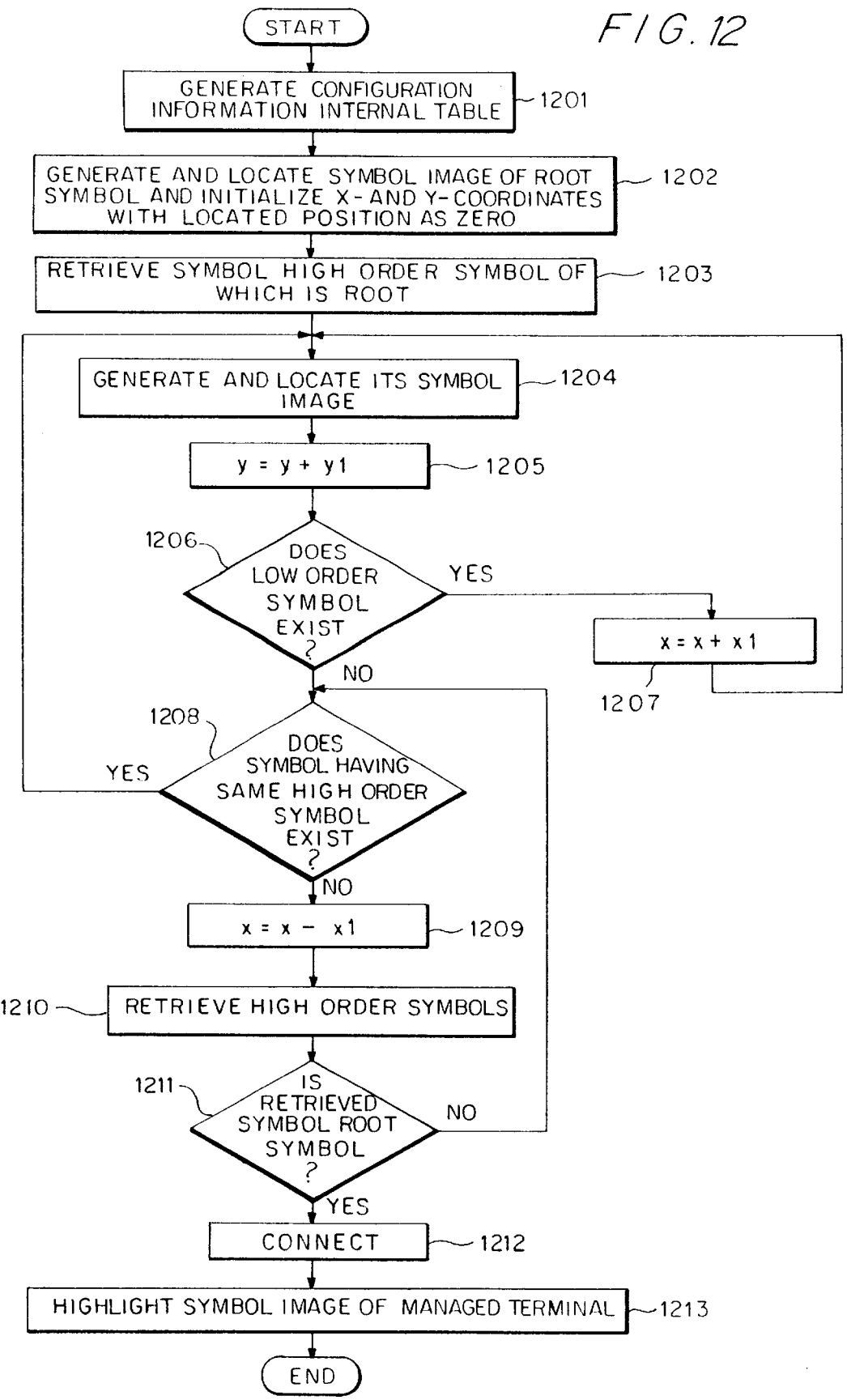
FIG. 12 is a flowchart illustrating the outline of the operation of the configuration information display section of the configuration information display program in the first embodiment.

FIG. 12 is a flowchart showing the outline of the operation of the configuration information display section 135 of the configuration information display program 136. It should be noted that each of the steps of the flowchart corresponds to code of a computer program.

As shown in FIG. 12, the configuration information display section 135 first generates a configuration information internal table 1301 shown in FIG. 13 based upon the received display information table 101 and the hierarchical information table 901 stored in the work memory 22 (step 1201). FIG. 13 shows the construction of the configuration information internal table 1301.

As shown in FIG. 13, the configuration information internal table 1301 includes for each identifier 1302, a class 1303 of managed equipment shown by a symbol, a state 1304 of the managed equipment shown by the symbol, a symbol name 1305 of the symbol, a hierarchy 1306 of the symbol, a number of symbols under the symbol 1307 and a high order symbol 1308. Symbols of each identifier 1302 are displayed in the form of an containment tree. In the configuration information internal table 1301, a symbol the identifier 1302 of which is zero, '0' is definitely set beforehand so that the corresponding class 1303 and symbol name 1305 are a root 1309. A symbol which is the root 1309 is located at the highest order of all symbols and therefore, a hierarchy 1306 corresponding to the symbol is set to zero, "0". Also, the information 1302 to 1305 and 1307, except the hierarchy 1306 and the high order symbol 1308 are transferred from the hierarchical information table 901 or the display information table 1101.

However, the configuration information display section 135 stores a value showing the number of low order symbols 1307 relative to the symbol which is the root 1309 in the field of the hierarchy 1306 according to hierarchical relationship shown in the hierarchical information table 901 and stores the identifier of a symbol in a high order by one in the field of the high order symbol 1308.

Next, the configuration information display section 135 locates each of the symbols to be displayed in an inclusive tree based upon the contents of the configuration information internal table 1301 generated in the step 1201 by repeating the steps 1202 to 1211. That is, first, the configuration information display section 135 generates the symbol image 1602 of the symbol which is the root 1309, locates the generated symbol image 1602 in a predetermined position on an inclusive tree screen 1601 shown in FIG. 16 and respectively sets initial values y1 and x1 having the location as an origin at an x-coordinate 1603 and at a y-coordinate 1604 (step 1202). The x-coordinate 1603 and the y-coordinate 1604 at which the initial values are set show positions in which the symbol image of a symbol in a low order by one of the symbol which is the root 1309 is to be located.

Next, the configuration information display section 135 retrieves a symbol of the identifier of the high order symbol 1308 of which is equal to the identifier 1302 of the symbol which is the root 1309 from the configuration information internal table 1301 (step 1203), generates the symbol image of the retrieved symbol and locates the generated symbol image in a position shown by values set at an x-coordinate 1603 and at a y-coordinate 1604 on the inclusive tree screen 1601 (step 1204).

The details of step 1204 provides that the configuration information display section 135 determines the icon format of an acquired symbol based upon the contents of a class/icon relating internal table 1401 which stores relationships between the class 1402 of managed equipment shown by the symbol and an icon format 1403 shown in FIG. 14. The configuration information display section 135 determines the color of the determined icon format based upon the contents of a state/icon color relating internal table 1501 which stores relationship information indicating relationships between the state 1501 of the managed equipment shown by the acquired symbol and an icon color 1502 shown in FIG. 15. Further, the configuration information display section 135 creates symbol images 1605 and 1606 shown in FIG. 16 by adding a symbol name 1305 and the number of subordinate symbols 1307. Finally, the configuration information display section 135 locates the created symbol images 1605 and 1606 in positions shown by the respective values set at an x-coordinate 1603 and at a y-coordinate 1604 on the inclusive tree screen 1601.

Next, the configuration information display section 135 adds a predetermined value y1 to a value at a y-coordinate 1604 in a step 1205 and judges whether a symbol in a lower order level of the maps related to the symbol image of which is located in the step 1204 exists or not (step 1206). The judgment can be executed by retrieving a symbol, the higher order symbol of which has the identifier 1302, of the symbol image of which is located in the step 1204 for example. If such a symbol exists, the configuration information display section 135 returns processing to step 1204 after adding a predetermined value x1 to a value at an x-coordinate 1603 (step 1207).

If no such symbol exists, the configuration information display section 135 judges whether a symbol in a higher order level of the map related to the symbol image of which is located in step 1204 exists or not (step 1208). The judgment can be executed by retrieving a symbol having the same symbol as the higher order symbol 1308 of the symbol, the symbol image of which, is located in step 1204 as a high order symbol 1308 for example. If such a symbol exists, the configuration information display section 135 returns processing to step 1204, generates and locates the symbol image of such a symbol. If no such symbol exists, the configuration information display section subtracts a predetermined value x1 from a value at an x-coordinate 1603 (step 1209), next retrieves a symbol having the higher order symbol 1308 of the symbol retrieved in step 1208 as the identifier 1302 (step 1210), repeats processing until a symbol to be next retrieved is the symbol which is the root 1309 (step 1211) and returns processing to step 1208.

Thus, if a symbol to be next retrieved is the symbol which is the root 1309 (step 1211), the symbol images 1602, 1605 and 1606 of all symbols to be displayed in an inclusive tree are located on the inclusive tree screen 1601. Afterward, the configuration information display section 135 completes the inclusive tree screen 1601 by connecting the symbol images 1602, 1605 and 1606 located on the inclusive tree screen 1601 (step 1212). It is desirable that the configuration information display section 135 causes the symbol image 1606 equivalent to the managed terminal 20 on the inclusive tree screen 1601 shown in FIG. 16 to be highlighted (step 1213).

As described above, according to the first embodiment, if network management is executed from the managed terminal 20, which is equipment managed by the network management system 10, a user who uses the managed terminal 20 is not required to retrieve the symbol of the managed terminal 20. Therefore, the user can immediately execute network management because partial network configuration related to the managed terminal 20 can be preferentially displayed in an inclusive tree. However, as is conceivable a user of the managed terminal 20 may wish to access various network configurations outside of the partial network configuration related to the managed terminal 20.

To enable the display of the configurations of various networks outside of the partial network configuration in an inclusive tree, if the symbol images of all symbols in a lower order level related to a symbol specified by a user are not located on the inclusive tree screen 1601, symbol developing processing in which the symbol images of such symbols are newly located is further executed according to the first embodiment. Also, to enable displaying the configurations of various networks outside of the partial network configuration in an inclusive tree, if the symbol images of all symbols in a lower order level of the maps related to a symbol specified by a user are located on the inclusive tree screen 1601, symbol closing processing in which the symbol images of such symbols are deleted is further executed according to the first embodiment.

Figure 17:
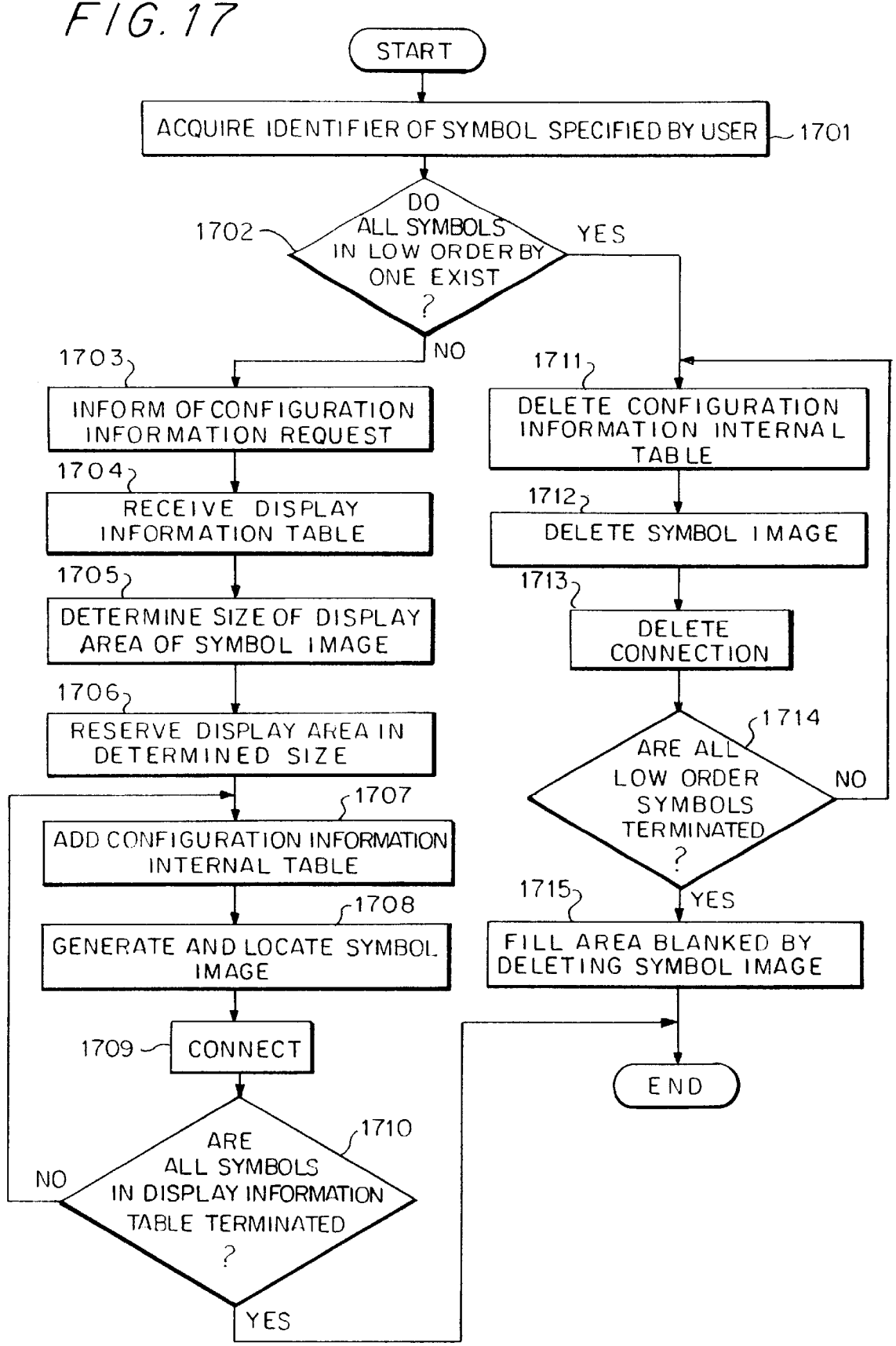
FIG. 17 is a flowchart illustrating the outline of symbol expanding/closing processing executed by the configuration information display section of the configuration information display program in the first embodiment.

FIG. 17 is a flowchart showing the outline of the symbol developing/closing processing executed by the configuration information display section 135 of the configuration information display program 136. It should be noted that each of the steps of the flowchart corresponds to code of a computer program.

As shown in FIG. 17, when a desired symbol is specified by selecting the corresponding symbol image on the inclusive tree screen 1601 by a user operating the mouse 27, the configuration information display section 135 of the configuration information display program 136 in the managed terminal 20 acquires the identifier 1302 of the symbol specified by the user from the configuration information internal table 1301 (step 1701). Next, the configuration information display section 135 judges whether each of the symbols in lower level maps relate to the symbol specified by the user. That is whether each of the symbols having the symbol specified by the user as the higher order symbol 1308 are stored in the configuration information internal table 1301 or not (step 1702). The judgment can be executed by retrieving symbols having the symbol specified by the user as the respective higher order symbol 1308 of the same number as the number of subordinate symbols 1308 corresponding to the identifier 1302 of the symbol specified by the user from the configuration information internal table 1301.

First, the symbol developing processing executed when information indicating a relation between each of the symbols in a lower order level of the maps related to a symbol specified by a user is not stored in the configuration information internal table 1301 will be described.

In the symbol developing processing, the configuration information display section 135 first informs the hierarchical symbol acquiring section 138 of the network management system 10 of the identifier 1302 of a symbol specified by a user and a request for transferring configuration information (step 1703). In the network management system 10, the hierarchical symbol acquiring section 138 generates the display information table 1101 storing the symbol information of each of the symbols, the higher order symbol 504 of which, has the identifier 1302 informed by the configuration information display section 135 of the managed terminal 20 as described in the flowchart shown in FIG. 10, and informs the configuration information display section 1305 of the managed terminal 20 of the generated display information table 1101.

When the configuration information display section 135 receives the display information table 1101 from the hierarchical symbol acquiring section 138 of the network management system 10 (step 1704), the configuration information display section 135 determines the size of a display area required to locate the symbol images based upon the number of symbols, the symbol information of which, is stored in the display information table 1101 (step 1705). Next, the configuration information display section 135 acquires all symbols, the symbol images of which are located at the y-coordinate of a value larger than the y-coordinate of a position at which the symbol image of a symbol specified by a user is located and shifts the y-coordinates of the respective locations of the symbol images of the acquired symbols so that a display area of the size determined in step 1705 can be secured (step 1706). Thereafter the configuration information display section 135 adds the information of symbols, the symbol information of which is stored in the display information table 1101 received in the step 1704, into the configuration information internal table 1301 (step 1707). The configuration information display section 135 creates and locates the symbol images of the above symbols (step 1708), and connects them (step 1709).

As described above, the symbol images of all symbols in a lower order level of the maps related to one symbol specified by the user are newly located on the inclusive tree screen 1601 by repeating steps 1707 to 1709 for each symbol, the symbol information of which is stored in the display information table 1101, received from the hierarchical symbol acquiring section 138 of the network management system 10 (step 1710).

Next, the symbol closing processing executed when the information of all symbols in a lower order level of the maps related to a symbol specified by a user is stored in the configuration information internal table 1301 will be described.

In the symbol closing processing, the configuration information display section 135 repeats processing for first deleting the information of each symbol from the configuration information internal table 1301 (step 1711), deleting the symbol image of each symbol from the inclusive tree screen 1601 (step 1712) and deleting a line connecting the symbol images of the symbols from the inclusive tree screen 1601 (step 1713) for each symbol in a lower order level of the maps related to a symbol specified by a user (step 1714). Next, the configuration information display section 135 acquires all symbols, the symbol images of which are located at the y-coordinate, of a value larger than the y-coordinate of a position in which the symbol image of the symbol specified by the user is located and shifts the y-coordinates of locations of the symbol images of the acquired symbols so that an area blanked by deleting all the symbol images in the step 1712 is filled (step 1715). Thus, the symbol images of all the symbols in a lower order level of the maps related to the symbol specified by the user are deleted from the inclusive tree screen 1601.

Figure 16:
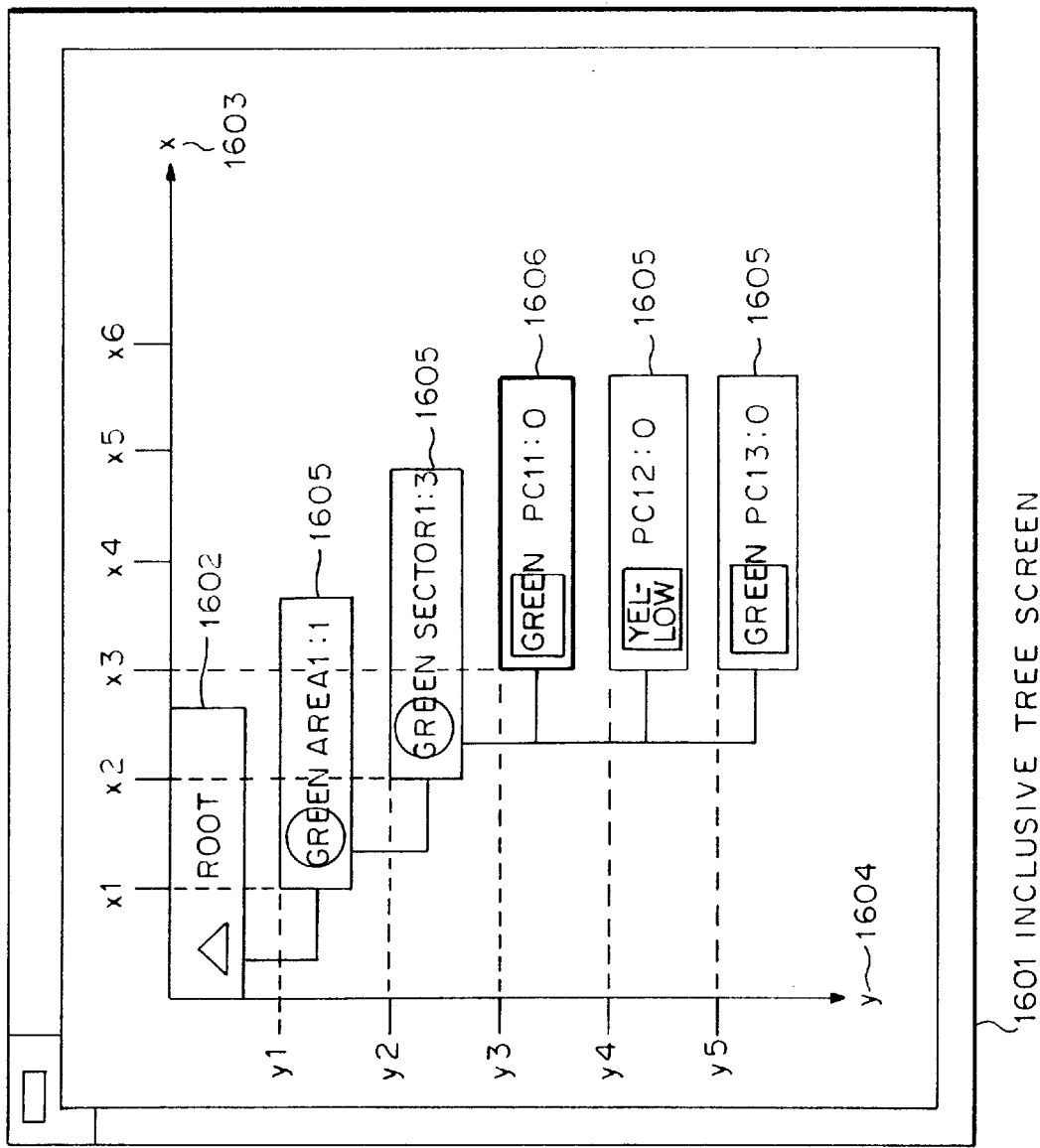
FIG. 16 is an explanatory drawing illustrating contents displayed on an inclusive tree screen in the first embodiment.
Figure 18:
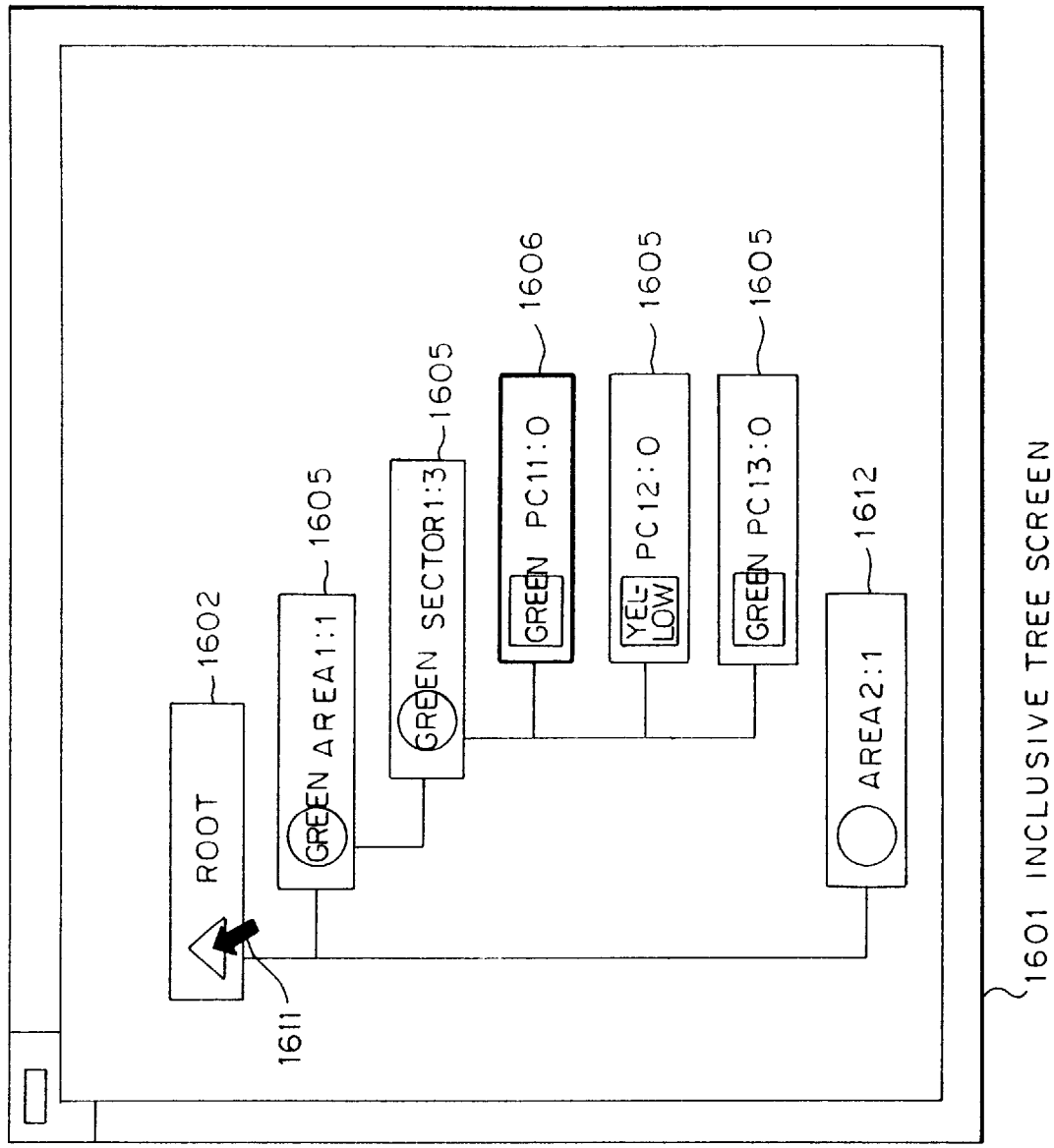
FIG. 18 is an explanatory drawing illustrating contents displayed on the inclusive tree screen after symbol expanding processing is executed in the first embodiment.
Figure 19:
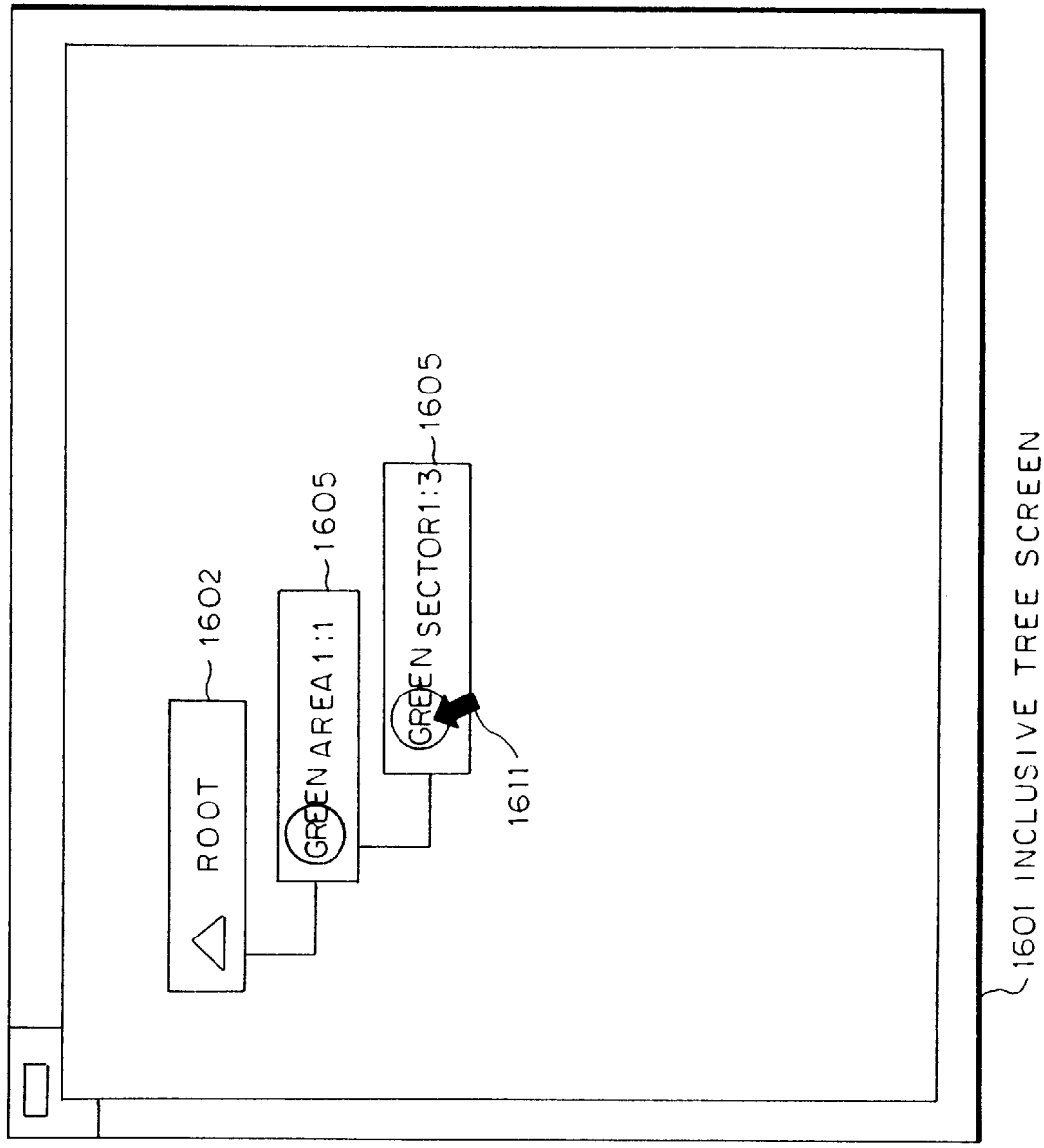
FIG. 19 is an explanatory drawing illustrating contents displayed on the inclusive tree screen after symbol closing processing is executed in the first embodiment.

For example, when the symbol which is the root is specified by a user moving a cursor 1611 to the symbol image 1602 which is the root on the inclusive tree screen 1601 shown in FIG. 16 as shown in FIG. 18 and the user operates the mouse, the symbol developing processing is executed. As a result, the symbol image 1612 of a symbol in a lower order level of the map, related to the symbol which is the root, is newly located on the inclusive tree screen 1601. Also, for example, when a symbol which is a sector 1 is specified by a user moving the cursor 1611 to a symbol image 1605 which is the sector 1 on the inclusive tree screen 1601 shown in FIG. 16 as shown in FIG. 19 and the user operates the mouse, the symbol closing processing is executed. As a result, the symbol image of a symbol in a lower order level of the maps related to the symbol which is the sector 1 is deleted from the inclusive tree screen 1601. Thus, the configurations of various networks including partial network configuration and whole network configurations can be displayed in an inclusive tree by executing the above described symbol developing/closing processing.

Next, referring to FIGS. 9, 10, 12 and 20 to 25, a second embodiment of the present invention will be described.

According to the second embodiment, when network management is executed from the managed terminal 20, event information related to the managed terminal 20 collected by the network management system 10 from network equipment 201 and 202 each including a managed equipment 20 and stored in the network management system 10, can be preferentially displayed.

Figure 20:
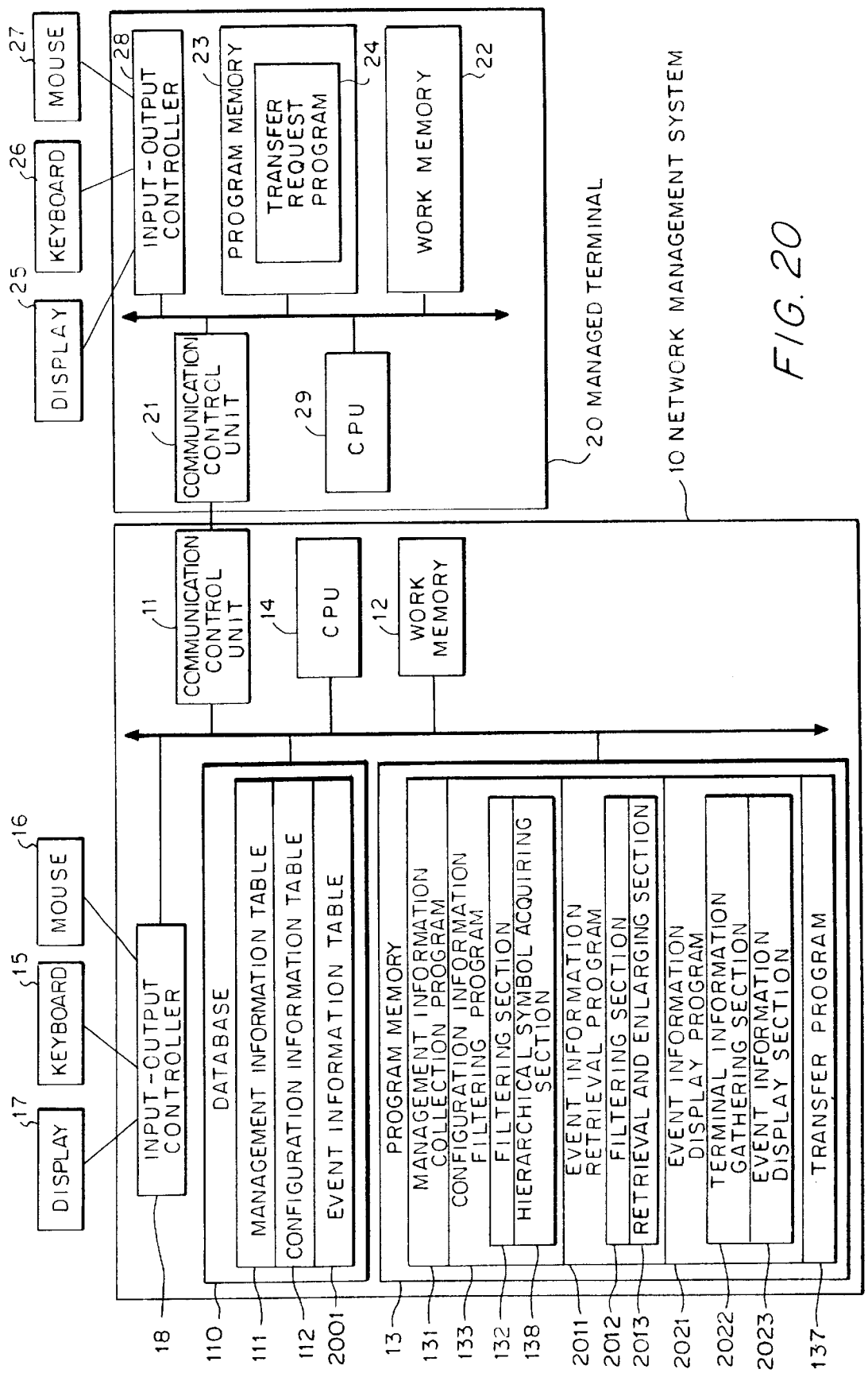
FIG. 20 is a block diagram illustrating the configuration of a network management system and a managed terminal respectively equivalent to a second embodiment.

FIG. 20 is a block diagram showing the configuration of a network management system 10 and a managed terminal 20 of the second embodiment.

In the second embodiment, the configuration of the managed terminal 20 is the same as in the first embodiment. In the second embodiment, the configuration of the network management system 10 is similar to that in the first embodiment. However, the configuration of the network management system 10 in the second embodiment is different from the first embodiment in that an event information display program 2021 is stored in program memory 13 in place of the configuration information display program 136. The event information display program 2021, similar to the configuration information display program 136, can be an Applet as per the JAVA and ACTIVE X programming languages. Also an event information retrieval program 2011 is stored in the program memory 13 and an event information table 2001 is stored in the database 110.

The event information display program 2021 is a program activated in a managed terminal 20 when it is transferred to the managed terminal 20 for causing the display of event information related to the managed terminal 20 on the managed terminal 20. The event information display program 2021 is provided with a terminal information gathering section 2022 and an event information display section 2023. The event information retrieval program 2011 is a program for acquiring event information related to a managed terminal 20 and is provided with a filtering section 2012 and a retrieval and enlargement section 2013.

In the network management system 10, CPU 14 periodically collects management information from each of network equipment 201 and 202 each including a managed terminal 20 via a communication control unit 11 by executing a management information collection program 131 as in the first embodiment. The collected management information is stored in a management information table 111. In the second embodiment, CPU 14 further receives an event log spontaneously informed by each of the network equipment 201 and 202 via the communication control unit 11 by executing the management information collection program 131. The event information of the received event log is stored in the event information table 2001 shown in FIG. 21. Contents stored as event information include an identifier 2102 uniquely showing an event log, an IP address 2103 of managed equipment informed about the event log, an informed time 2104 showing time in which the event log is informed, informed contents 2105 showing the contents of the event log and an information type 2106 showing the type of the event log as shown in FIG. 21. The identifier 2102 is a number given so that the closer to the present time the informed time 2104 is, the smaller the number is.

The operation of the second embodiment will be described below.

When a user instructs the managed terminal 20 to execute network management under the above environment, a transfer request program 24 first informs the transfer program 137 of the network management system 10 of a request for transferring the event information display program 2021. In the network management system 10, when the transfer program 137 receives the request for transferring the event information display program 2021 to the managed terminal 20, the transfer program 137 transfers the event information display program 2021 stored in the program memory 13 to the work memory 22 of the managed terminal 20. In the managed terminal 20, when the event information display program 2021 is transferred to the work memory 22 from the network management system 10, the event information display program 2021 is automatically activated. When the event information display program 2021 is activated in the managed terminal 20, the terminal information gathering section 2022 first acquires the IP address of the managed terminal 20, same as the terminal information gathering section 134 of the configuration information display program 136 in the first embodiment, and informs the event information retrieval program 2011 of the network management system 10 of the request for transferring event information together with the acquired IP address. In the network management system 10, when the event information retrieval program 2011 receives the request for transferring event information and the IP address from the managed terminal 20, the filtering section 2012 is operated as shown in the flowchart in FIG. 22.

Figure 22:
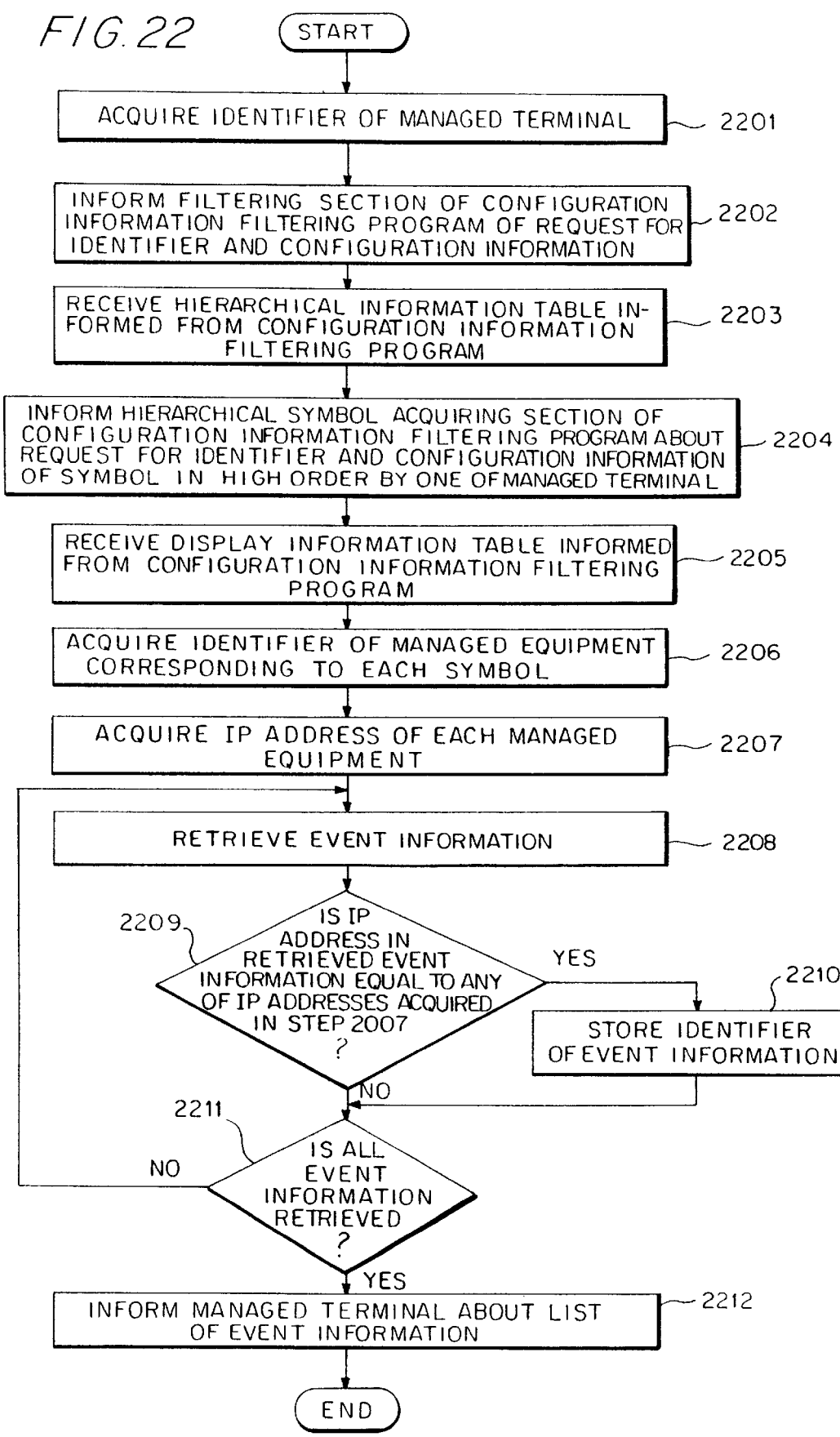
FIG. 22 is a flowchart illustrating the outline of the operation of the filtering section of an event information retrieval program in the second embodiment.

FIG. 22 is a flowchart showing the outline of the operation of the filtering section 2012 of the event information retrieval program 2011. It should be noted that each of the steps of the flowchart corresponds to code of a computer program.

As shown in FIG. 22, the filtering section 2012 of the event information retrieval program 2011 first retrieves an IP address 304 equal to the IP address received from the managed terminal 20 from the management information table 111 and acquires an identifier 302 corresponding to the retrieved IP address 304, that is, the identifier 302 of the managed terminal 20 (step 2201). Next, the filtering section 2012 of the event information retrieval program 2011 informs the filtering section 132 of a configuration information filtering program 133 of a request for configuration information together with the identifier 302 acquired in step 2201 (step 2202).

When the filtering section 132 of the configuration information filtering program 133 is informed of the request for configuration information and the identifier 302 by the filtering section 2012 of the event information retrieval program 2011, the filtering section 132 generates a hierarchical information table 901 showing a location in a map including a symbol having the informed identifier 302 as the corresponding node 505, that is, the symbol of the managed terminal 20. The filtering section 132 also informs the filtering section 2012 of the event information retrieval program 2011 of the generated hierarchical information table 901 same as the operations described in the flowchart shown in FIG. 8. When the filtering section 2012 of the event information retrieval program 2011 is informed of the hierarchical information table 901 from the filtering section 132 of the configuration information filtering program 133 (step 2203), the filtering section 2012 informs a hierarchical symbol acquiring section 138 of the configuration information filtering program 133 of a request for configuration information together with the identifier 902 of a symbol in a high order related to the symbol of the managed terminal 20 in the hierarchical information table 901 (step 2204).

When the hierarchical symbol acquiring section 138 of the configuration information filtering program 133 is informed of the request for configuration information and the identifier 902 of the symbol by the filtering section 2012 of the event information retrieval program 2011, the hierarchical symbol acquiring section 138 generates the display information table 1101 which stores the symbol information of all symbols, the higher order symbol 504 of which has the informed identifier 902 of the symbol, that is, all symbols included in a map including the symbol of the managed terminal 20. The hierarchical symbol acquiring section 138 also informs the filtering section 2012 of the event information retrieval program 2011 of the generated display information table 1101 same as the operations described in the flowchart shown in FIG. 10.

When the filtering section 2012 of the event information retrieval program 2011 is informed of the display information table 1101 by the hierarchical symbol acquiring section 138 of the configuration information filtering program 133 (step 2205), the filtering section 2012 of the event information retrieval program 2011 acquires the identifier of managed equipment corresponding to each symbol, the symbol information of which is stored in the display information table 1101 (step 2206). In step 2206, the filtering section 2012 of the event information retrieval program 2011 retrieves the node 505 corresponding to a symbol having an identifier equivalent to an identifier 1102 stored in the display information table 1101 as the identifier 502 from a configuration information table 112. Next, the filtering section 2012 of the event information retrieval program 2011 acquires the IP address of each managed equipment, the identifier of which is acquired in step 2206 (step 2207).

In step 2207, the filtering section 2012 of the event information retrieval program 2011 retrieves an IP address 304 corresponding to an identifier 302 equal to the corresponding node 505 from the management information table 111 because the corresponding node 505 retrieved in step 2206 is equivalent to an identifier 302 in the management information table 111. The IP address 304 of any managed equipment existing in a partial network related to the managed terminal 20 is acquired by the above operation.

Afterward, the filtering section 2012 of the event information retrieval program 2011 checks whether event information corresponding to any managed equipment, the IP address 304 of which is acquired in step 2207 is stored in the event information table 2001 or not. If event information has been stored, the filtering section 2012 informs the event information display program 2021 of the managed terminal 20 of a list of such event information. That is, the filtering section 2012 of the event information retrieval program 2011 retrieves event information stored in the event information table 2001 in the order of identifiers 2102 (step 2208), checks whether an IP address 2103 of the retrieved event information is equal to any of the IP addresses 304 acquired (step 2207) or not (step 2209) and if so, the filtering section stores the identifiers 2102 of the retrieved event information (step 2210).

Figure 23:
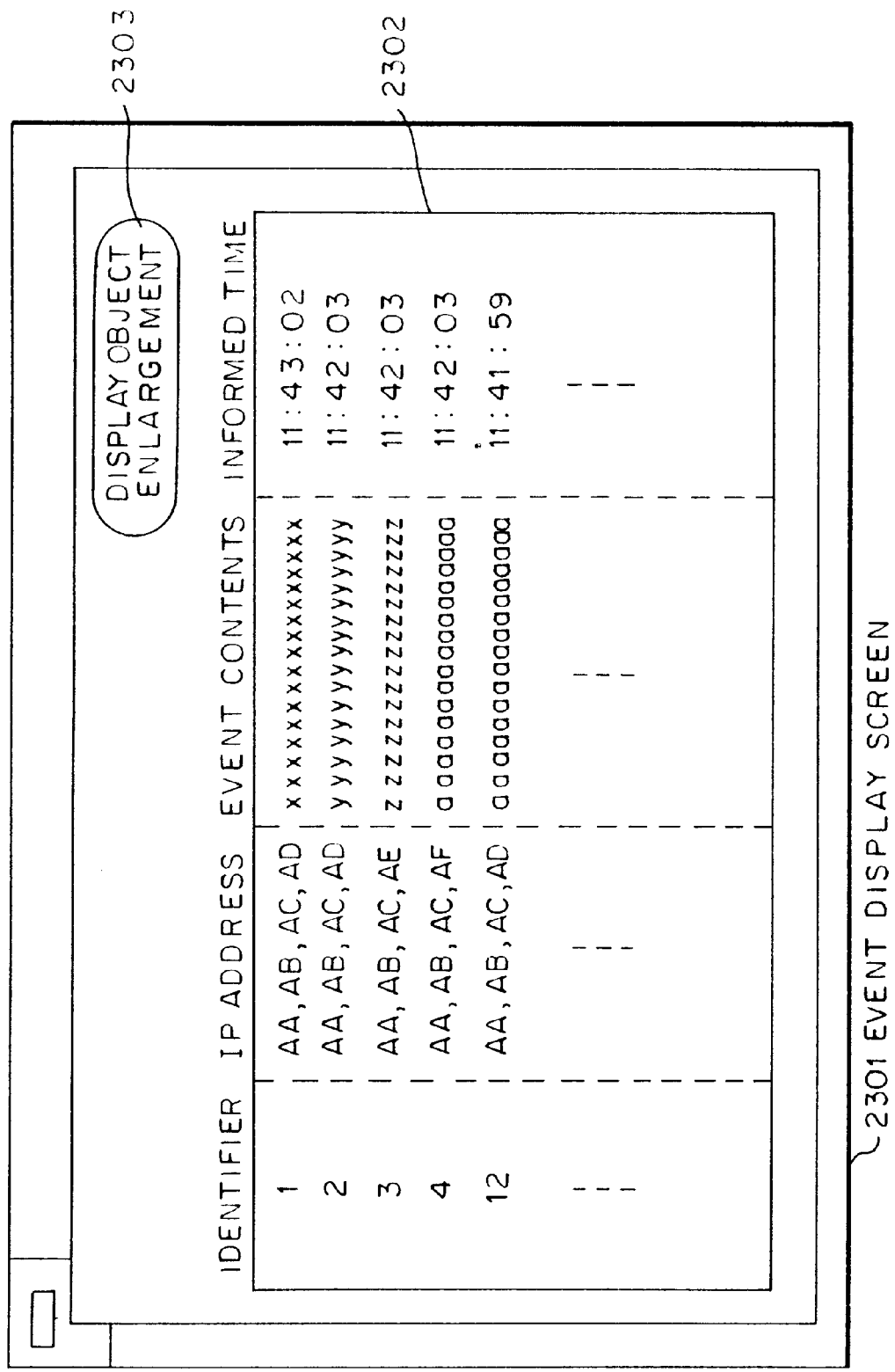
FIG. 23 is an explanatory drawing illustrating contents displayed on an event display screen in the second embodiment.

After steps 2208 to 2210 are repeated for each event information stored in the event information table 2001 (step 2211), the filtering section 2012 of the event information retrieval program 2011 extracts event information shown by the identifiers 2102 based upon all the identifiers 2102 stored in (step 2210) from the event information table 2001 and informs the event information display program 2021 of the managed terminal 20 of a list of the extracted event information (step 2212). In the managed terminal 20, when the event information display section 2023 of the event information display program 2021 receives the list of event information from the filtering section 2012 of the network management system 10, the managed terminal 20 displays the list of the received event information in an event list display area 2302 on an event display screen 2301 as shown in FIG. 23.

As described above, event information, related to a managed terminal 20 is collected from the network equipment 201 and 202 including the managed terminal 20 by the network management system 10 and stored therein, such event information can be preferentially displayed according to the second embodiment when network management is executed from the managed terminal 20. A user who uses the managed terminal 20 is not required to retrieve the event information of the managed terminal 20 and can immediately execute network management.

However, it is conceivable that a user of a managed terminal 20 may want to access various event information except event information related to the managed terminal 20. To enable displaying of the various event information, in the second embodiment, enlargement processing for gradually enlarging event information to be displayed according to the instruction of a user is further executed.

Figure 24:
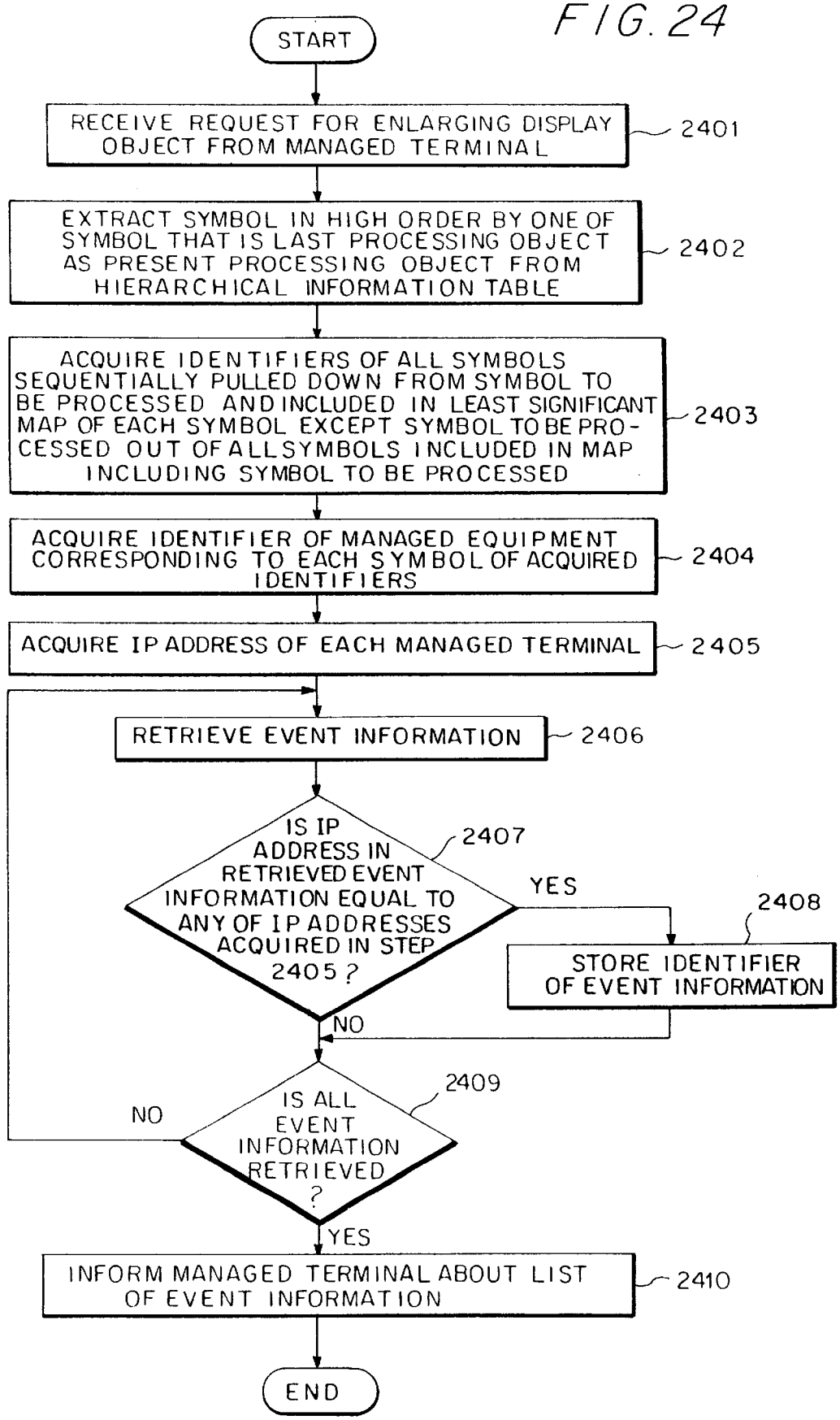
FIG. 24 is a flowchart illustrating the outline of enlargement processing executed by the retrieval and enlargement section of the event information retrieval program in the second embodiment.

FIG. 24 is a flowchart showing the outline of enlargement processing executed by the retrieval and enlargement section 2013 of the event information retrieval program 2011. It should be noted that each of the steps of the flowchart corresponds to code of a computer program.

As shown in FIG. 23, a display object enlarging button 2303 used by a user to instruct the enlargement of event information to be displayed on the event display screen 2301. When a user instructs the enlargement of event information to be displayed by actuating the display object enlarging button 2303 via the mouse 27, the event information display program 2021 of the managed terminal 20 informs the retrieval and enlargement section 2013 of the event information retrieval program 2011 of the network management system 10 of a request for enlarging a displayed object.

In the network management system 10, when the retrieval and enlargement section 2013 of the event information retrieval program 2011 receives the request for enlarging the displayed object from the event information display program 2021 of the managed terminal 20 as shown in FIG. 24 (step 2401), the filtering section 2012 of the event information retrieval program 2011 retrieves a symbol in a higher order level map related to the enlarged symbol in the last enlargement processing from the hierarchical information table 901 informed by the filtering section 132 of the configuration information filtering program 133 in the operation described in the flowchart shown in FIG. 22. That is, the hierarchical information table 901 shows a location in a map including the symbol of the managed terminal 20 and enlarges the above symbol (step 2402).

In the step 2402, in case this enlargement processing is the first enlargement processing after displaying a list of event information related to a managed terminal 20, the retrieval and enlargement section 2013 receives and enlarges a symbol in a higher order level maps related to the symbol of the managed terminal 20. Next, the retrieval and enlargement section 2013 acquires the identifiers of all symbols included in the least significant map sequentially pulled down from each symbol, except a symbol to be retrieved and enlarged, of all symbols included in a map including the above symbol to be retrieved and enlarged (step 2403).

In step 2403, the retrieval and enlargement section 2013 first informs the hierarchical symbol acquiring section 138 of the configuration information filtering program 133 of a request for configuration information and the identifier 902 of a symbol in a higher order level map related to the symbol to be retrieved and enlarged. If the symbol information of a symbol in a higher order level map related to the symbol to be retrieved and enlarged is not stored in the hierarchical information table 901, the retrieval and enlargement section 2013 informs that the above symbol in a higher order level map is the most significant symbol in place of the identifier 902.

When the hierarchical symbol acquiring section 138 is informed of the request for configuration information and the identifier 902 of the symbol by the retrieval and enlargement section 2013, the hierarchical symbol acquiring section 138 generates the display information table 1101 which stores the symbol information of all symbols, the higher order symbol 504 of which includes the informed identifier 902 of the symbol. In other words, all symbols included in a map including the symbol to be retrieved and enlarged as the operation described in the flowchart shown in FIG. 10. The hierarchical symbol acquiring section 138 also informs the retrieval and enlargement section 2013 of the generated display information table 1101 when the hierarchical symbol acquiring section 138 is informed of information that the symbol is the most significant symbol by the retrieval and enlargement section 2013. The hierarchical symbol acquiring section 138 generates the display information table 1101 which stores the symbol information of all symbols, of which no higher order symbol 504 exists, and informs such to the display information table.

When the retrieval and enlargement section 2013 is informed of the display information table 1101 by the hierarchical symbol acquiring section 138, the retrieval and enlargement section 2013 informs the hierarchical symbol acquiring section 138 of a request for configuration and the identifier 1102 of each symbol, except the symbol to be retrieved and enlarged, of all symbols the symbol information of which is stored. This is done since the symbol information of the symbol to be retrieved and enlarged is also stored in the display information table 1101. Thus, the display information table 1101 which stores the symbol information of symbols in a lower order level of the maps including the symbol to be retrieved and enlarged is informed by the hierarchical symbol acquiring section 138.

As described above, if the display information table 1101 is informed by the hierarchical symbol acquiring section 138 of the identifiers 1102 of all symbols included in the least significant map sequentially pulled down from each symbol, except the symbol to be retrieved and enlarged then symbols included in a map including the symbol to be retrieved and enlarged can be acquired from the informed display information table 1101. When the number of subordinate symbols 1106 in the symbol information is zero "0", acquiring can not occur. The retrieval and enlargement section 2013 acquires the identifier of managed terminal corresponding to each symbol of all the identifiers 1102 acquired in step 2403 respectively (step 2404).

In step 2404, the retrieval and enlargement section 2013 retrieves the node 505 corresponding to a symbol, the identifier 502 of which is equal to each identifier 1102 acquired in step 2403 from the configuration information table 112. Next, the retrieval and enlargement section 2013 acquires the IP address of each managed terminal, the identifier of which is acquired in step 2404 (step 2405).

In step 2405, the retrieval and enlargement section 2013 retrieves the IP address 304 corresponding to an identifier 302 which is equivalent to the corresponding node 505 from the management information table 111. This is done since the corresponding node 505 retrieved in step 2404 is equivalent to an identifier 302 in the management information table 111. The IP addresses 304 of the managed terminal corresponding to all symbols included in the least significant map sequentially pulled down from each symbol are acquired by the above processing. All symbols are acquired except a symbol to be retrieved and enlarged.

Afterward, the retrieval and enlargement section 2013 checks whether event information corresponding to each managed terminal, the IP address 304 of which is acquired in the step 2405, is stored in the event information table 2001 or not. If so, the retrieval and enlargement section 2013 informs the event information display program 2021 of the managed terminal 20 about a list of such event information.

The retrieval and enlargement section 2013 retrieves event information stored in the event information table 2001 in ascending order of identifiers 2102 (step 2406). The retrieval and enlargement section 2013 also checks whether the IP address 2103 in the retrieved event information is equal to any of the IP addresses acquired in step 2405 or not (step 2407). If so, the identifier 2102 in the retrieved event information is stored (step 2408).

After steps 2406 to 2408 are repeated for each event information stored in the event information table 2001 (step 2409), the retrieval and enlargement section 2013 extracts event information shown by all the identifiers 2102 stored in step 2408 from the event information table 2001 and informs the event information display program 2021 of the managed terminal 20 of a list of the extracted event information (step 2410). In the managed terminal 20, when the event information display section 2023 of the event information display program 2021 receives the list of event information from the retrieval and enlargement section 2013 of the network management system 10, the managed terminal 20 adds the received list of event information to the event list display area 2302 on the event display screen 2301 and displays it.

Figure 25:
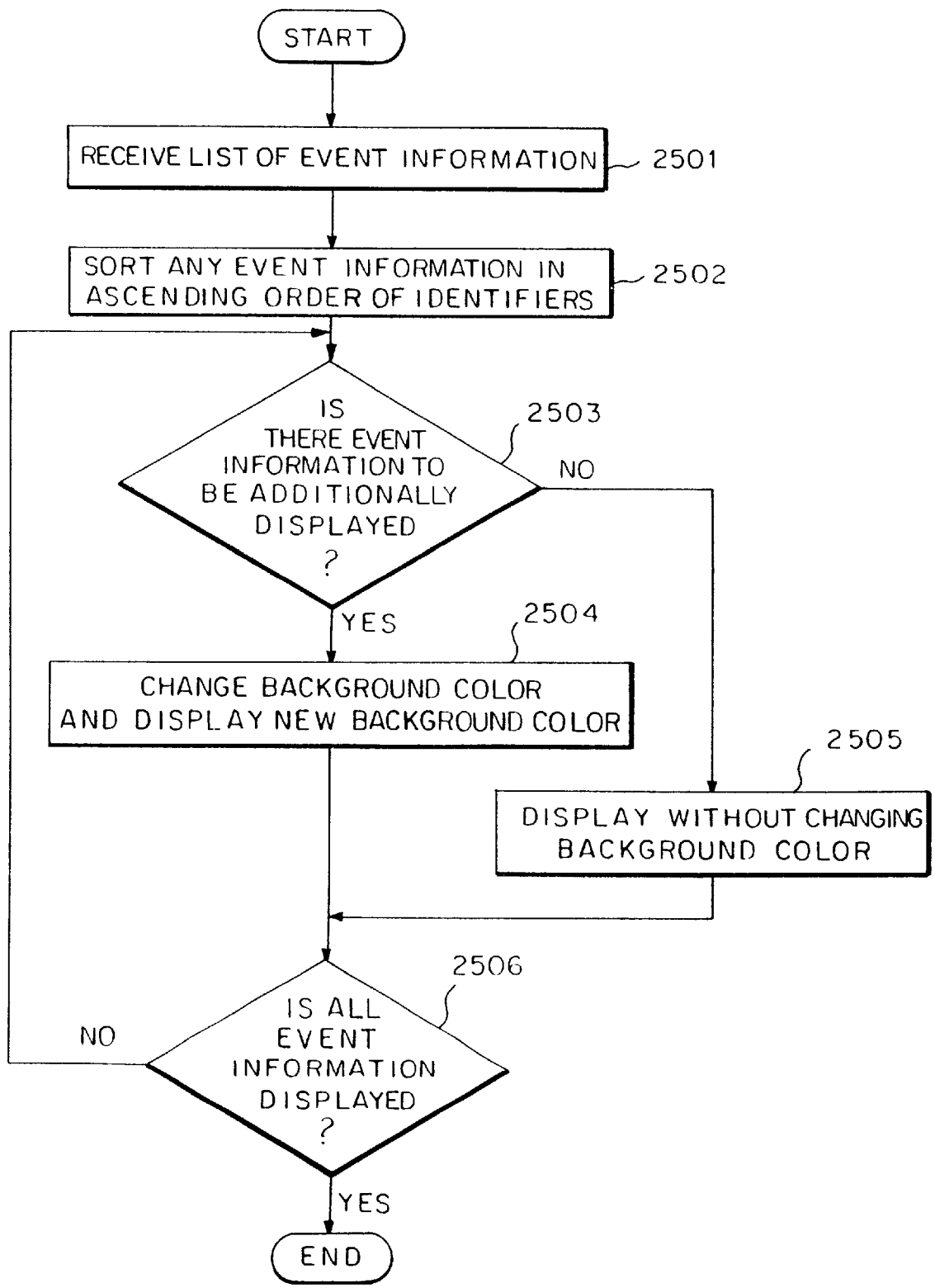
FIG. 25 is a flowchart illustrating the outline of additional display processing executed by the event information display section of an event information display program in the second embodiment.

FIG. 25 is a flowchart showing the outline of additional display processing executed when the event information display section 2023 adds and displays the list of the event information. It should be noted that each of the steps of the flowchart corresponds to code of a computer program.

As shown in FIG. 25, when the event information display section 2023 receives the list of event information from the retrieval and enlargement section 2013 of the network management system 10 (step 2501), the event information display section 2023 sorts the received event information and any event information already displayed in the event list display area 2302 on the event display screen 2301 in ascending order of identifiers 1802 (step 2502). Next, the event information display section 2023 judges whether each event information sorted in step 2506 is event information to be additionally displayed or not (step 2503). This judgment can be executed by judging whether the above sorted event information is the event information received in the step 2501 or not. If the above event information is event information to be additionally displayed, the event information display section 2023 displays the event information and changes the color of the background of the event information (step 2504). If the event information is not event information to be additionally displayed, the event information display section 2023 displays the event information without a change in the color of the background of the event information (step 2505). When the display of event information is finished as described above, the event display screen 2301 shown in FIG. 23 is changed as shown in FIG. 26.

Figure 26:
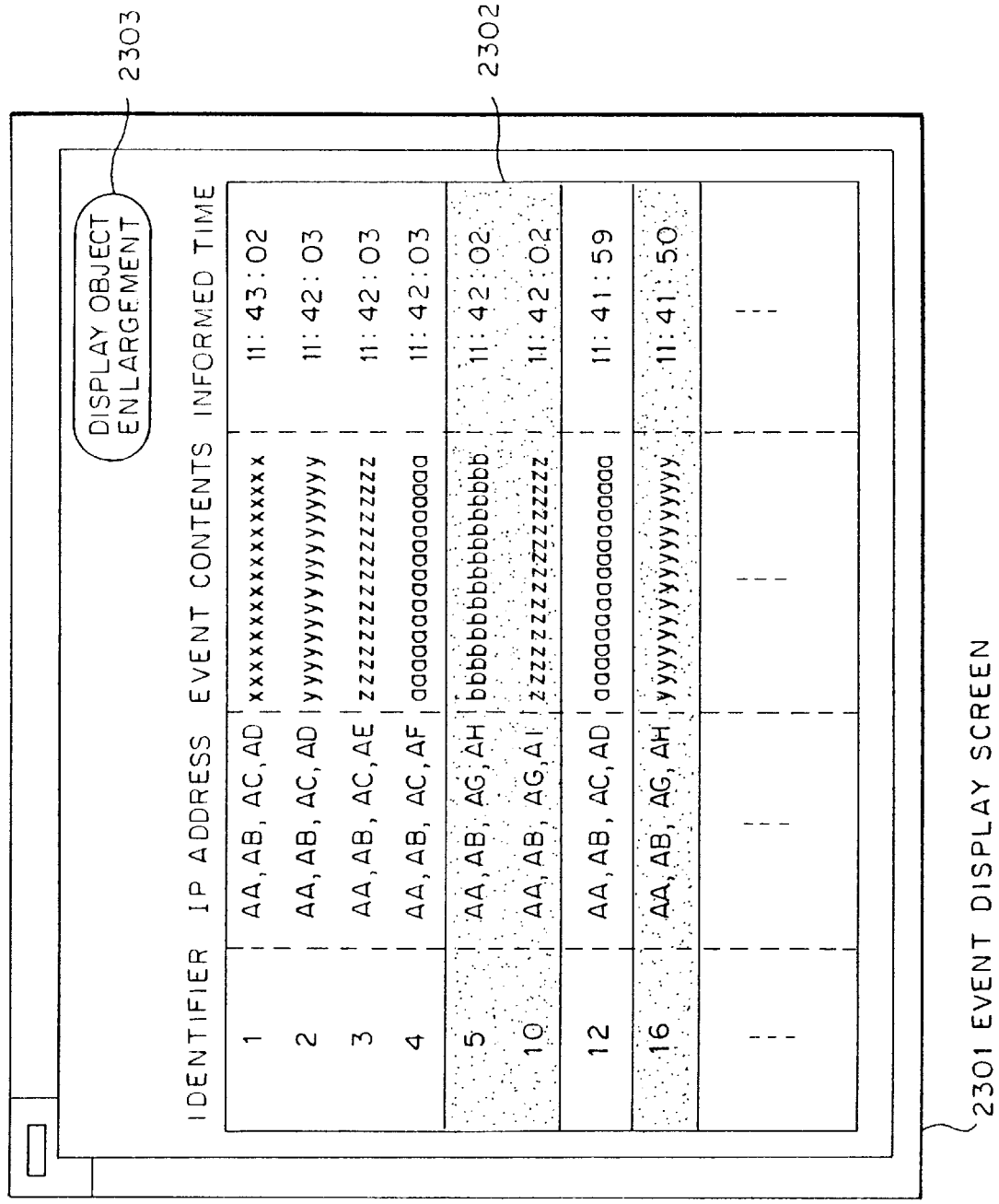
FIG. 26 is an explanatory drawing illustrating contents displayed on the event display screen after additional display processing is executed in the second embodiment.

In FIG. 26 the event information 5, 10 and 16 on the event display screen 2301 indicate that they are event information additionally displayed after a user activates the display object enlarging button 2303 via the mouse 27. According to processing shown in the flowchart in FIG. 25, the event information display section 2023 changes the color of the background of event information when event information to be additionally displayed is displayed. This is executed to permit a user to easily identify the event information that is event information additionally displayed. However, the present invention is not limited to this embodiment, for example, event information to be additionally displayed may be underlined and the color of the event information itself may be also changed. Event information to be displayed can be gradually enlarged by executing the above enlargement processing and additional display processing.

Figure 27:
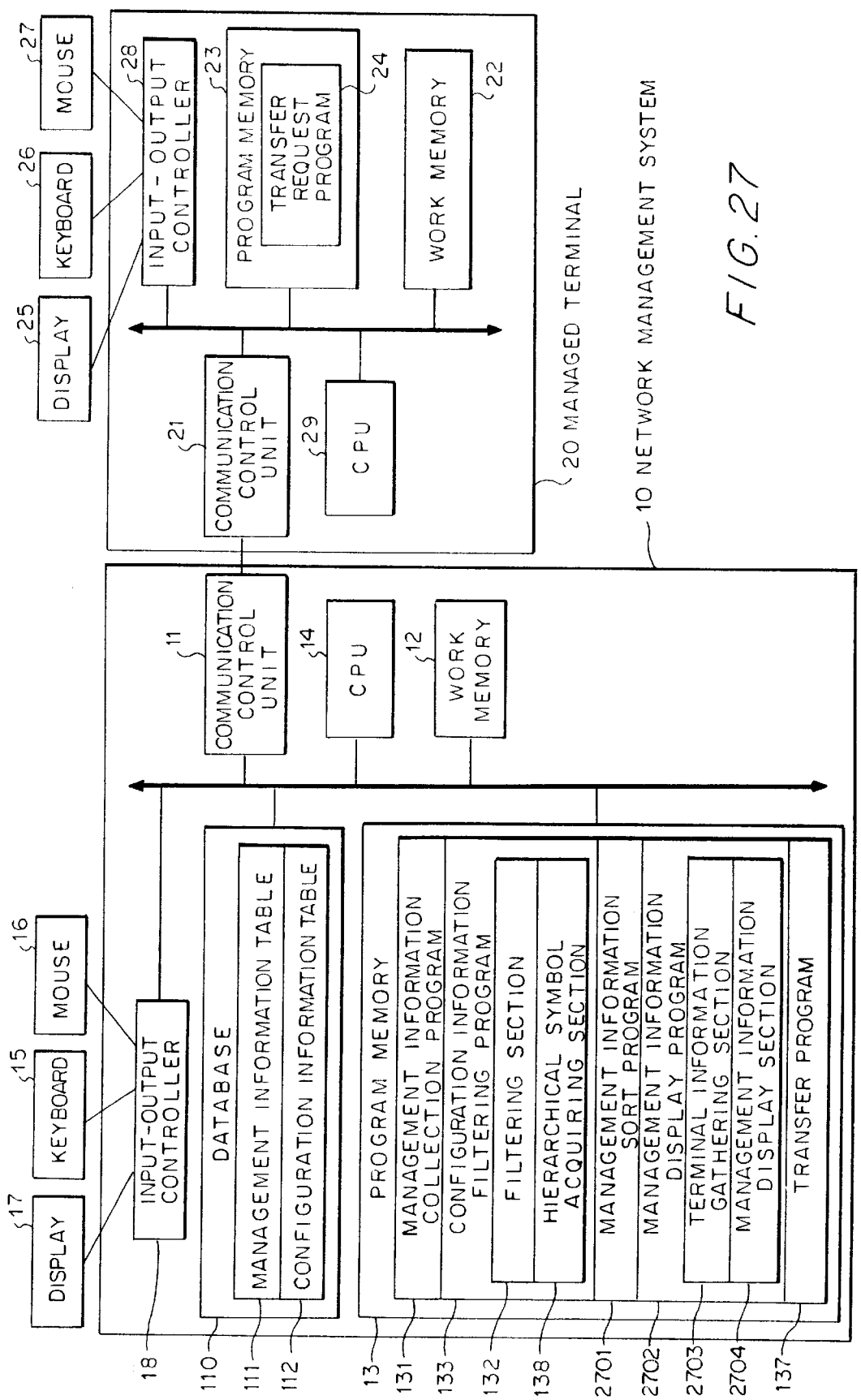
FIG. 27 is a block diagram illustrating the construction of a network management system and a managed terminal respectively equivalent to a third embodiment.

Next, referring to FIGS. 27 to 29, a third embodiment of the present invention will be described.

The third embodiment enables preferentially displaying management information related to a managed terminal and matched with a retrieval condition set by a user who uses the managed terminal 20 when network management is executed from the managed terminal 20. FIG. 27 is a block diagram showing the configuration of a network management system 10 and a managed terminal 20 included in the third embodiment.

In the third embodiment, the configuration of the managed terminal 20 is the same as in the first embodiment. Also, in the third embodiment, the configuration of the network management system 10 is similar to that in the first embodiment. However, the configuration of the network management system in the third embodiment is different from that in the first embodiment in that a management information display program 2702 is stored in program memory 13 in place of a configuration information display program 136 and a management information sort program 2701 is stored in the program memory 13. Here again the management information display program 2701, similar to the configuration information display program 136, can be an Applet according to the JAVA and ACTIVE X programming languages.

The management information display program 2702 is a program activated in a managed terminal 20 when it is transferred to the managed terminal 20 for causing the display of management information matched with a retrieval condition set by a user using the managed terminal 20. The management information display program 2702 is provided with a terminal information gathering section 2703 and a management information display section 2704. The management information sort program 2701 is a program for sorting management information so that the display of management information related to a managed terminal 20 is effected. In the network management system 10, CPU 14 periodically collects management information from each network equipment 201 and 202 each including a managed terminal 20 via a communication control unit 11 by executing a management information collection program 131 as in the first embodiment and stores the collected management information in a management information table 111.

The operation of the third embodiment will be described below.

When a user instructs a managed terminal 20 to execute network management under the above environment, a transfer request program 24 first informs the transfer program 137 of the network management system 10 of a request for transferring the management information display program 2702. In the network management system 10, when the transfer program 137 receives the request for transferring the management information display program 2702 from the managed terminal 20, the transfer program 137 transfers the management information display program 2702 stored in the program memory 13 to the work memory 22 of the managed terminal 20. In the managed terminal 20, the management information display program 2702 is automatically activated when it is transferred from the network management system 10 to the work memory 22.

Figure 28:
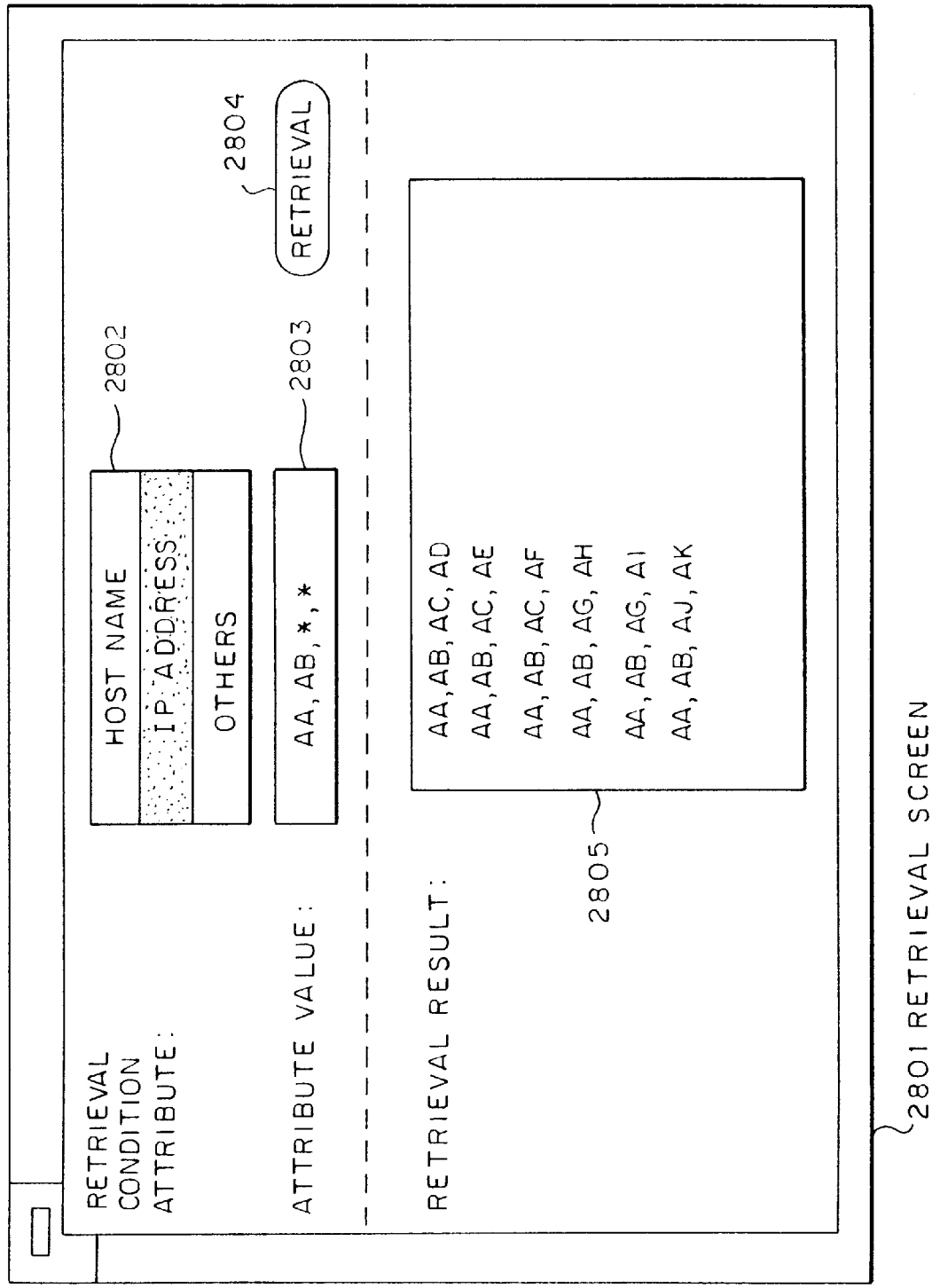
FIG. 28 is an explanatory drawing illustrating contents displayed on a retrieval screen in the third embodiment.

In the managed terminal 20, when the management information display program 2702 is activated, the terminal information gathering section 2703 first causes the display of a retrieval screen 2801 shown in FIG. 28 for example on a display 25 after acquiring the IP address of the managed terminal 20 similar to the terminal information gathering section 134 of the configuration information display program 136 in the first embodiment. The management information display program 2702 then waits for a user to set a retrieval condition and instruct the execution of a retrieval using the set retrieval condition.

As shown in FIG. 28, the retrieval screen 2801 includes a retrieval condition attribute setting area 2802 for allowing a user to set the attribute of a retrieval condition, an attribute value input area 2803 for allowing a user to input an attribute value equivalent to the retrieval condition, a retrieval button 2804 for allowing a user to instruct the execution of retrieval and a retrieval result display area 2805 for displaying the result of the retrieval. On the retrieval screen 2801 shown in FIG. 28, an example is illustrated where a user sets an IP address as the attribute of a retrieval condition and inputs "AA. AB.*.*" as an attribute value so as to set a retrieval condition. The above code means that a user wants to retrieve an IP address in the format of "AA. AB.*.*". After the user sets the retrieval condition, the execution of the retrieval by activating the retrieval button 2804 via the mouse 27 is instructed.

In the managed terminal 20, when the user instructs the execution of the retrieval, the terminal information gathering section 2703 informs the management information sort program 2701 of the network management system 10 of a request for transferring management information together with the already acquired IP address and the retrieval condition set by the user. In the network management system 10, when the management information sort program 2701 receives the request for transferring management information, the IP address and the retrieval condition from the managed terminal 20, the network management system 10 is operated as shown in the flowchart in FIG. 29.

Figure 29:
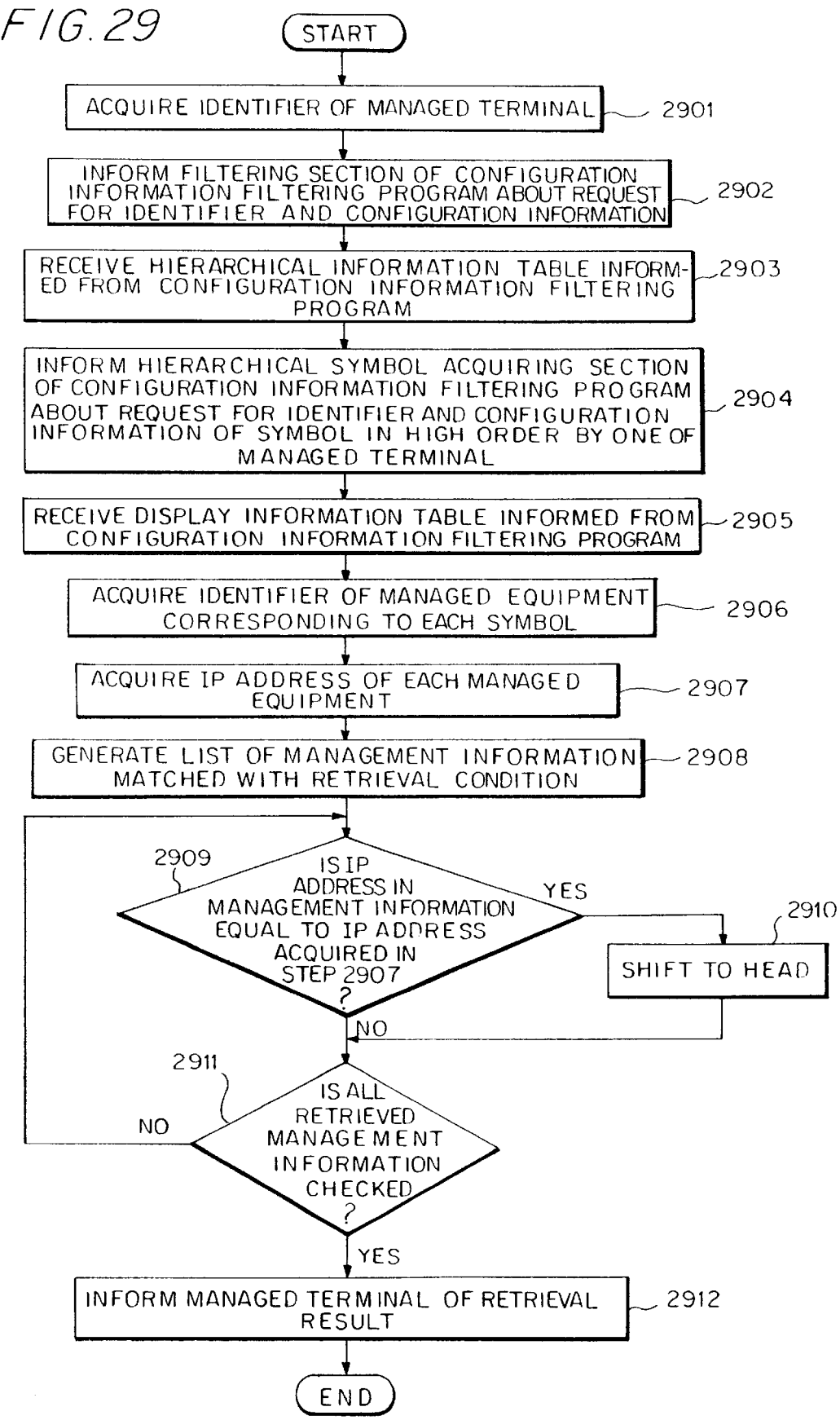
FIG. 29 is a flowchart illustrating the outline of the operation of a management information sort program in the third embodiment.

FIG. 29 is a flowchart showing the outline of the operation of the management information sort program 2701. It should be noted that each of the steps of the flowchart corresponds to code of a computer program.

As shown in FIG. 29, the management information sort program 2701 first acquires the IP address of any managed equipment existing in a partial network related to the managed terminal 20 by executing the same operation in steps 2901 to 2907 as steps 2201 to 2207 shown in FIG. 22 executed by the filtering section 2012 of the event information retrieval program 2011. That is, the management information sort program 2701 retrieves an IP address 304 equal to the IP address received from the managed terminal 20 from the management information table 111 and acquires an identifier 302 corresponding to the retrieved IP address 304. The identifier 302 is of the managed terminal 20 (step 2901). Next, the management information sort program 2701 informs the filtering section 132 of the configuration information filtering program 133 of a request for configuration information together with the identifier 302 acquired in step 2901 (step 2902).

As the hierarchical information table 901 showing a location in a map including the symbol of the managed terminal 20 is informed by the filtering section 132 of the configuration information filtering program 133 (step 2903), the management information sort program 2701 informs the hierarchical symbol acquiring section 138 of the configuration information filtering program 133 of the request for configuration information together with the identifier 902 of a symbol in a higher order level map which includes a symbol of the managed terminal 20 in the hierarchical information table 901 (step 2904). As the display information table 1101 which stores the symbol information of all symbols included in a map including the symbol of the managed terminal 20 is supplied by the hierarchical symbol acquiring section 138 of the configuration information filtering program 133 (step 2905), the management information sort program 2701 acquires the identifier of managed equipment corresponding to each symbol, the symbol information of which is stored in the display information table 1101 (step 2906).

In step 2906, the management information sort program 2701 retrieves the node 505 corresponding to a symbol provided with an identifier 502 equal to an identifier 1102 stored in the display information table 101 from the configuration information table 112. Next, the management information sort program 2701 acquires the IP address of each managed equipment the identifier of which is acquired in step 2906 (step 2907). In the step 2907, as the corresponding node 505 retrieved in step 2906 is equivalent to an identifier 302 in the management information table 111, the management information sort program 2701 retrieves the IP address 304 corresponding to an identifier 302 equal to the corresponding node 505 from the management information table 111. The IP address 304 of any managed equipment existing in a partial network related to the managed terminal 20 is acquired by the above operation.

Thereafter, the management information sort program 2701 generates a list of the management information matched with the retrieval condition received from the managed terminal 20 and retrieved from the management information table 111 (step 2908). In step 2908, as shown in FIG. 28, retrieval condition set by a user on a retrieval screen 2801 provides, for example, that the management information sort program 2701 retrieves an IP address 304 according to a format of "AA. AB.*.*", that is, "AA. AB. AC. AD", "AA. AB. AC. AE", "AA. AB. AC. AF", "AA. AB. AG. AH", "AA. AB. AG. AI" and "AA. AB. AJ. AK".

Next, the management information sort program 2701 checks whether the IP address 304 corresponding to each management information, the list of which is generated in step 2908 (step 2911), is equal to any of the IP addresses 304 acquired in step 2907 or not (step 2909). If so the management information sort program 2701 shifts such management information at the head of the list (step 2910). The management information related to the managed terminal 20 is located in a higher order by sorting the list of management information generated in step 2908 as described above. Thereafter, the management information sort program 2701 informs the management information display program 2702 of the managed terminal 20 of a sorted list of management information (step 2911).

In the managed terminal 20, when the management information display section 2704 of the management information display program 2702 receives the list of management information from the management information sort program 2701 of the network management system 10, the managed terminal 20 displays the list of management information in the retrieval result display area 2805 on the retrieval screen 2801 shown in FIG. 28 as the result of retrieval. As described above, according to the third embodiment, management information related to a managed terminal can be located in a higher order when a list of management information matched with a retrieval condition set by a user is displayed on the managed terminal 20 and when network management is executed from the managed terminal 20. The management information is displayed in such manner to allow the user of the managed terminal 20 to readily recognize management information related to the managed terminal 20.

In the third embodiment, the management information sort program 2701 of the network management system 10 may inform a list of management information related to a managed terminal 20 and a list of other management information separately to the managed terminal 20. The management information display section 2704 of a managed terminal 20 may also display a boundary line between both lists.

Next, referring to FIGS. 30 to 34, a fourth embodiment of the present invention will be described.

The fourth embodiment enables preferentially displaying partial network configuration related to a managed terminal 20 in an inclusive tree as in the first embodiment when network management is executed from the managed terminal 20. The fourth embodiment also allows for the contents of the display of the partial network configuration to be changed according to the performance of the managed terminal 20.

Figure 30:
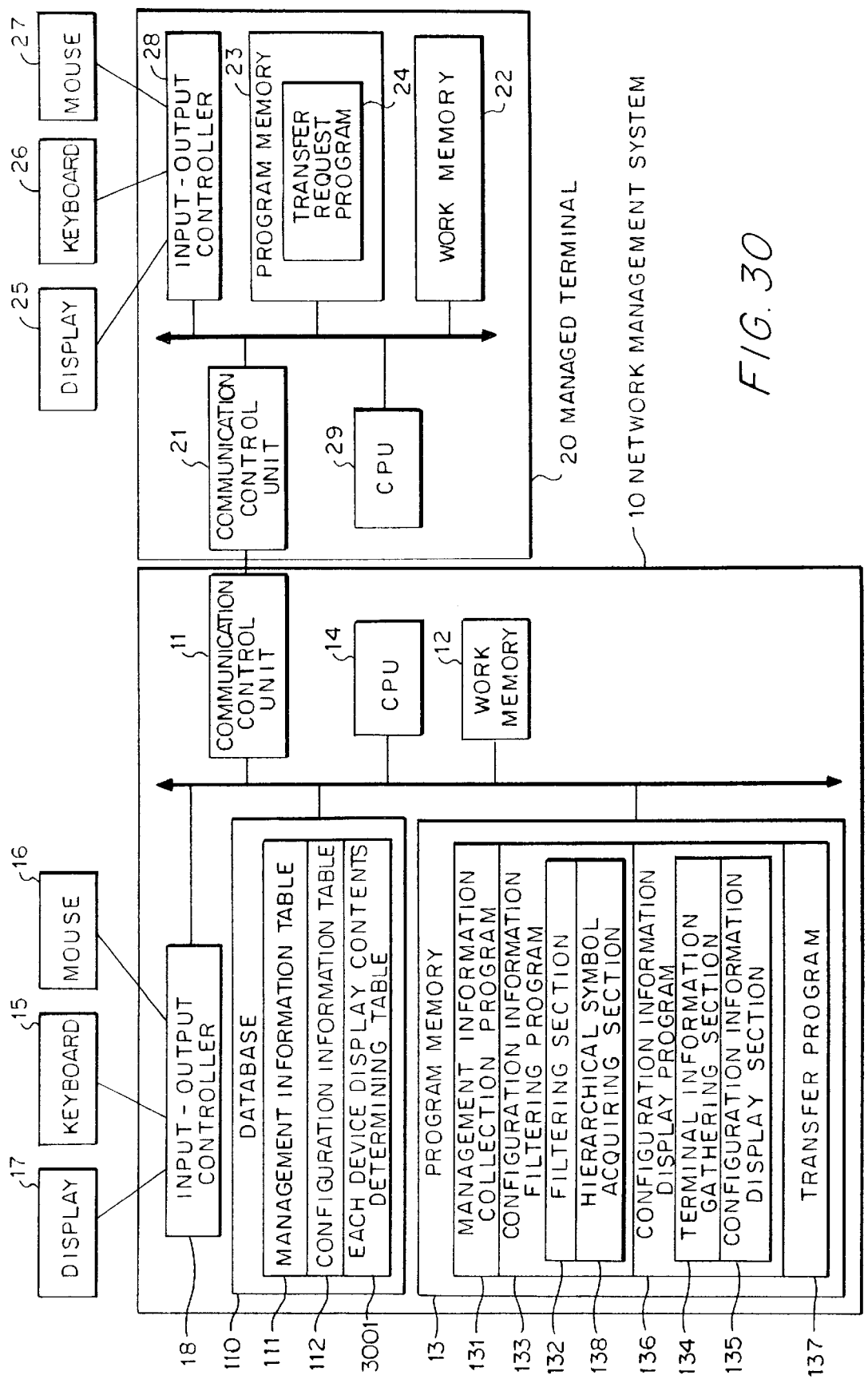
FIG. 30 is a block diagram illustrating the configuration of a network management system and a managed terminal respectively of a fourth embodiment.

FIG. 30 is a block diagram showing the configuration of a network management system 10 and a managed terminal 20 of the fourth embodiment. The configuration of a managed terminal 20 in the fourth embodiment is the same as in the first embodiment. Also, the configuration of the network management system 10 in the fourth embodiment is similar to that in the first embodiment. However, the network management system of the fourth embodiment is different from that in the first embodiment in that an each device display contents determining table 3001 is stored in the database 110. FIG. 31 shows an example of the each device display contents determining table 3001.

As shown in FIG. 31, the each device display contents determining table 3001 is a matrix table relating contents displayed on a managed terminal 20 to keys of the memory capacity 3102 of work memory 22 and the CPU format 3103 of CPU 29. For example, on a managed terminal 20 the memory capacity 3102 of the work memory 22 is 10 MB or less and the CPU format of CPU 29 is CPU-A. Partial network configuration related to the managed terminal 20 is displayed in an inclusive tree in which symbol images, each of which includes a symbol name, are connected.

The operation of the fourth embodiment will be described below.

Figure 32:
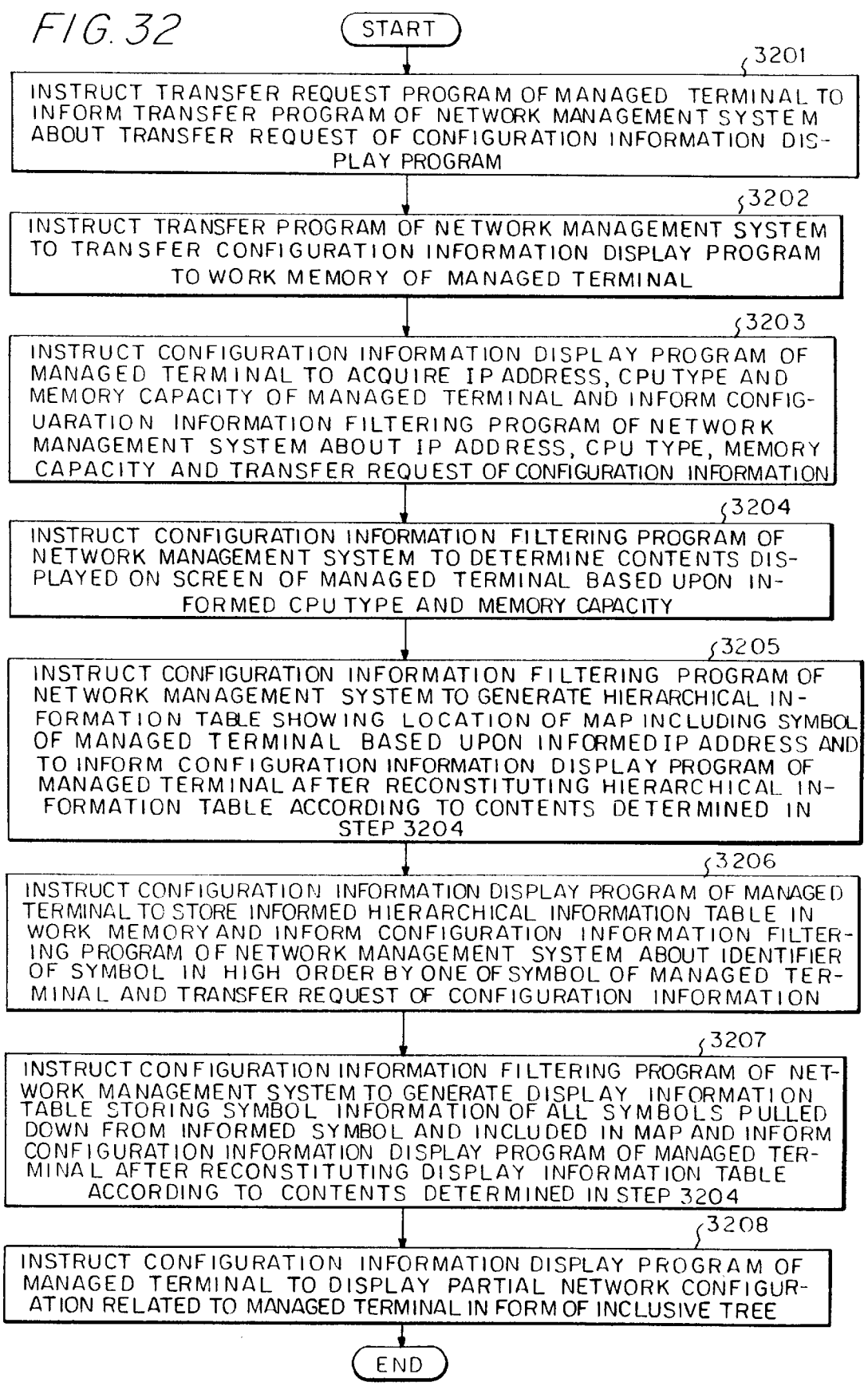
FIG. 32 is a flowchart illustrating the outline of the operation of the network management system and the managed terminal in the fourth embodiment.

FIG. 32 is a flowchart showing the outline of the operation of the network management system 10 and a managed terminal 20 in the fourth embodiment of the present invention. It should be noted that each of the steps of the flowchart corresponds to code of a computer program.

As shown in FIG. 32, when a user instructs the managed terminal 20 to execute network management, a transfer request program 24 first informs the transfer program 137 of the network management system 10 of a request for transferring a configuration information display program 136 as in the first embodiment (step 3201). In the network management system 10, when the transfer program 137 receives the request for transferring the configuration information display program 136 from the managed terminal 20, the network management system 10 transfers the configuration information display program 136 stored in the program memory 13 to the work memory 22 of the managed terminal 20 as in the first embodiment (step 3202).

In the managed terminal 20, when the configuration information display program 136 is transferred from the network management system 10 to the work memory 22, the configuration information display program 136 is automatically activated. When the configuration information display program 136 is activated, a terminal information gathering section 134 first acquires the IP address of the managed terminal 20 as in the first embodiment. However, in the fourth embodiment, the terminal information gathering section further gathers the CPU format of CPU 29 and the memory capacity of the work memory 22. The terminal information gathering section 134 informs the configuration information filtering program 133 of the network management system 10 of a request for transferring configuration information together with the gathered IP address, CPU format and memory capacity (step 3203).

In the network management system 10, when the configuration information filtering program 133 receives the request for transferring configuration information together with the IP address, CPU format and memory capacity from the managed terminal 20, the network management system 10 first determines contents to be displayed on the managed terminal 20 by retrieving the each device display contents determining table 3001 using the CPU format and the memory capacity respectively received from the managed terminal 20 as keys in the fourth embodiment (step 3204). Thereafter, the configuration information filtering program 133 generates a hierarchical information table 901 showing a location in a map including the symbol of the managed terminal 20 by the filtering section 132 which filters required information from a configuration information table 112 based upon the IP address received from the managed terminal 20 as in the first embodiment. However, in the fourth embodiment, the configuration information filtering program 133 further informs the configuration information display program 136 of the managed terminal 20 of a relocated (modified) hierarchical information table 901 after the generated hierarchical information table 901 is relocated according to the contents determined in the step 3204 (step 3205).

For example, in a managed terminal 20 the memory capacity 3102 of the work memory 22 is 10 MB or less and the CPU format of CPU 29 is CPU-A. A partial network configuration related to the managed terminal 20 is displayed in an inclusive tree in which symbol images, each of which includes a symbol name, are connected. The symbol information of each symbol includes the identifier 902 and the symbol name 903 in the relocated hierarchical information table 901. In the managed terminal 20, when the configuration information display section 135 receives the hierarchical information table 901 from the configuration information filtering program 133 of the network management system 10, the configuration information display section 135 stores the received hierarchical information table 901 in the work memory 22 and informs the configuration information filtering program 133 of a request for transferring configuration information together with the identifier 902 of a symbol in a high order of the symbol of the managed terminal 20 in the hierarchical information table 901 as in the first embodiment (step 3206).

In the network management system 10, when the configuration information filtering program 133 receives the request for transferring configuration information and the identifier 902 of the symbol from the managed terminal 20, the hierarchical symbol acquiring section 138 of the configuration information filtering program generates a display information table 110 storing the symbol information of all symbols included in a map pulled down from the symbol shown by the received identifier 902. Thus, the display includes all symbols included in a map including the symbol of the managed terminal 20 as in the first embodiment. However, in the fourth embodiment, the hierarchical symbol acquiring section 138 further informs the configuration information display program 136 of the managed terminal 20 of a relocated (modified) display information table 1101 after relocating the generated display information table 1101 according to contents determined in the step 3204 (step 3207).

Figures 33, 34:
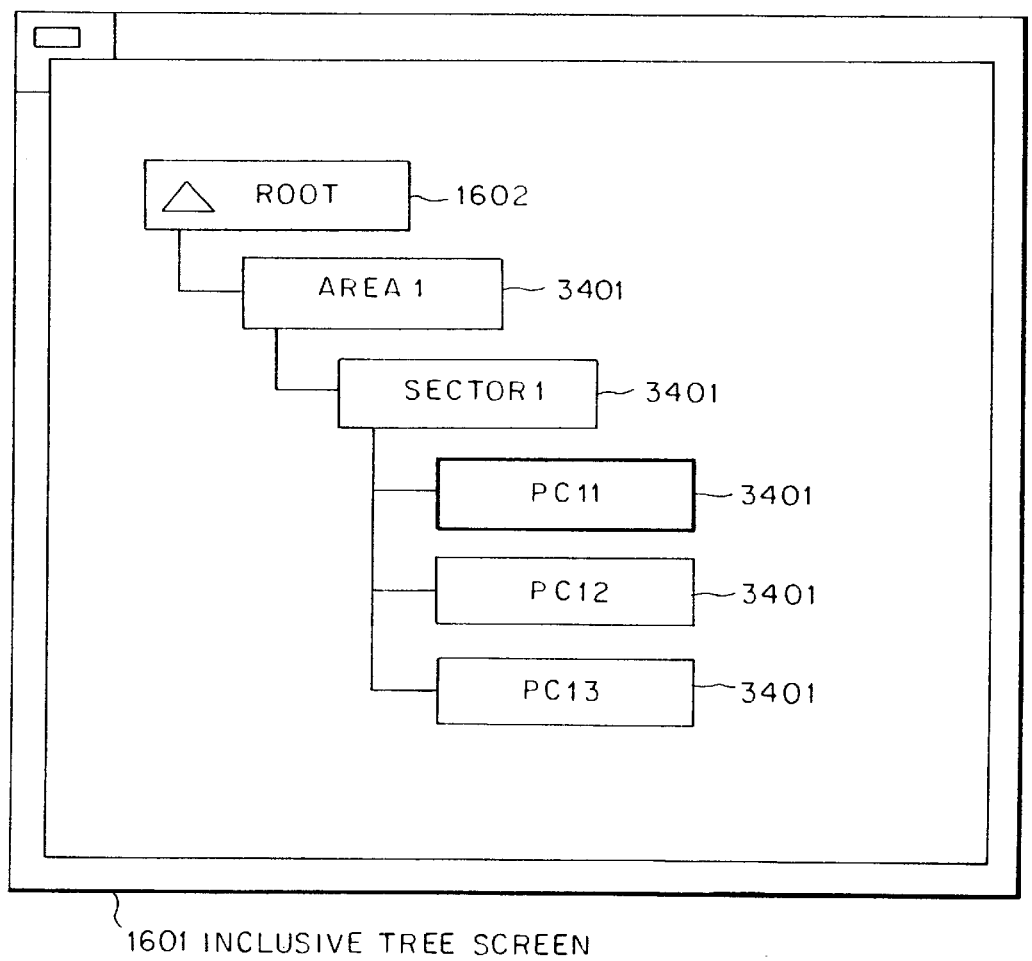
FIG. 33 is an explanatory drawing illustrating a reconstituted display information table in the fourth embodiment.
FIG. 34 is an explanatory drawing illustrating contents displayed on an inclusive tree screen displayed in the fourth embodiment.

For example, in a managed terminal 20 the memory capacity 3102 of the work memory 22 is 10 MB or less and the CPU format of CPU 29 is CPU-A. Partial network configuration related to the managed terminal 20 is displayed in an inclusive tree in which symbol images, each of which includes only a symbol name, are connected. The symbol information of each symbol includes the identifier 1102 and the symbol name 1103 as shown in FIG. 33 in the relocated display information table 1101.

In the managed terminal 20, the configuration information display section 135 of the configuration information display program 136 receives the display information table 1101 from the configuration information filtering program 133 of the network management system 10. The configuration information display section 135 displays partial network configuration related to the managed terminal 20 based upon the display information table 1101 and the hierarchical information table 901 stored in the work memory 22 in step 3206. The partial network configuration is displayed in an containment tree as in the first embodiment (step 3208).

In step 3208, the configuration information display section 135 of the configuration information display program 136 executes the operation shown in the flowchart in FIG. 12. However, in the fourth embodiment, the contents of the configuration information internal table 1301 generated in the step 1201 are different according to the hierarchical information table 901 and the display information table 110 respectively received from the configuration information filtering program 133 of the network management system 10. The symbol image created in the step 1204 is also different according to the configuration information internal table 1301.

For example, in a managed terminal 20 the memory capacity 3102 of the work memory 22 is 10 MB or less and the CPU format of CPU 29 is CPU-A. As the symbol information of each symbol respectively includes the identifier 902, 1102 and the symbol name 903, 1103 in the received hierarchical information table 901 and display information table 1101, the configuration information display section 135 generates a configuration information internal table 1301 including items of the identifier 1302, the symbol name 1305, the hierarchy 1306 and the higher order symbol 1308. Also, as the configuration information display section 135 generates and locates a symbol image including the symbol name 1305, if such a configuration information internal table 1301 is generated, an containment tree screen 1601 in which symbol images 3401, each of which includes the symbol name 1305 connected as shown in FIG. 34, is displayed on the display 25 of the managed terminal 20.

As described above, according to the fourth embodiment, partial network configuration related to a managed terminal 20 can be preferentially displayed in an containment tree as in the first embodiment. When network management is executed from the managed terminal 20 a user using the managed terminal 20 is not required to retrieve the symbol of the managed terminal 20 and can immediately execute network management.

Further, according to the fourth embodiment, contents to be displayed can be changed according to the performance of the managed terminal 20. For example, a part of display information can be deleted when partial network configuration related to the managed terminal 20 is displayed in an inclusive tree. Thus, the load of the managed terminal 20 can be reduced.

In the fourth embodiment, the performance of a managed terminal is defined by the memory capacity 3102 of its work memory 22 and the CPU format 3103 of CPU 29. However, the fourth embodiment is not limited to a situation where only information defining the performance of a managed terminal 20 effects the processing of the configuration information display program 136. Any other information can be collected by the terminal information gathering section 134 and used to effect processing of the configuration information display program 136.

As described above, the fourth embodiment is based upon the application of the first embodiment. The second and third embodiments are respectively independent of the first embodiment. However, it should be well understood by those of ordinary skill in the art that two or more of the first (or the fourth) to the third embodiments may be combined.

As described above, the present invention provides for partial information related to a managed terminal of information required for network management to be preferentially displayed on the managed terminal when network management is executed from the managed terminal. The present invention permits a user to easily manage the network by use of the network management system at any location in the network.

The present invention further provides for partial network configuration related to a managed terminal to be preferentially displayed in the form of an containment tree when the configuration of a network displayed in the form of a hierarchical map by a network management system is displayed on the managed terminal. The present invention permits a user to easily grasp the layout of the partial network configuration related to the managed terminal on one screen.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An information providing system having a network terminal and a network management system which manages a network and provides information for said network terminal in said managed network, wherein said network management system comprises:

a database that has information related to said managed network, and an information program that extracts a part of said information relating to said network terminal from said database in response to a request from said network terminal, said part of information is extracted based on information included in said request which identifies said network terminal in said network, and sends said extracted part of information to said network terminal, and wherein said network terminal comprises:

a processing program that sends said request including said information which identifies said network terminal to said network management system, and processes said extracted information sent from said network management system.

2. An information providing system according to claim 1, wherein said processing program is a display program that displays based on said extracted part of information.

3. An information providing system according to claim 2, wherein said extracted information corresponds to a part of configuration information of said network, and wherein said display program displays a part of network configuration relating to said network terminal.

4. An information providing system according to claim 3, wherein said part of network configuration information is constructed with a plurality of levels, and wherein said display program represents said network configuration hierarchically.

5. An information providing system according to claim 2, wherein said display program is sent from said network management system to said network terminal in response to a request from said network terminal.

6. An information providing system according to claim 3, wherein said database comprises:

a management information database that stores management information collected from said network terminal; and a network configuration information database that stores network configuration information necessary for displaying configuration of said network.

7. An information providing system according to claim 6, wherein said information program searches said management information database for an identifier of said network terminal based on said information for specifying said network terminal, and extracts said part of configuration information from said configuration information database on said identifier of said network terminal.

8. An information providing system according to claim 7, wherein network management system comprises:

a management information collection program that collects management information from said network terminal to manage said management information database.

9. An information providing system according to claim 8, wherein said management information collection program periodically collects said management information.

10. An information providing system according to claim 2, wherein said display program highlights said network terminal.

11. An information providing system according to claim 7, wherein said information for specifying said network terminal is a network address of said network terminal in said network.

12. The information providing system according to claim 1, wherein said information program extracts said part of information when said information program receives said request at first from said network terminal.

* * * * *